United States Patent
Bond et al.

(10) Patent No.: US 8,130,914 B2
(45) Date of Patent: *Mar. 6, 2012

(54) CALLING CARD HAVING AN ASSOCIATED PRE-RECORDED PERSONAL GREETING

(75) Inventors: James Duke Bond, Allen, TX (US); Stacy Borocz, Roswell, GA (US); Anne Gillman, Marietta, GA (US); Karl Henderson, Highland Village, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1218 days.

This patent is subject to a terminal disclaimer.

(21) Appl. No.: 11/555,143

(22) Filed: Oct. 31, 2006

(65) Prior Publication Data
US 2007/0121842 A1    May 31, 2007

Related U.S. Application Data

(63) Continuation of application No. 09/123,109, filed on Jul. 27, 1998, now Pat. No. 7,145,989.

(51) Int. Cl.
*H04M 1/64* (2006.01)

(52) U.S. Cl. ...... 379/76; 379/51; 379/88.01; 379/88.18; 379/88.25; 379/114.16; 709/202; 709/223

(58) Field of Classification Search ............ 379/76, 379/114.2, 121.04, 127.01, 201.02, 265.01, 379/51, 88.01, 88.18, 88.25, 114.11, 114.16, 379/142.01; 455/564, 408, 432.2; 705/39, 705/44; 709/202, 223

See application file for complete search history.

(56) References Cited

U.S. PATENT DOCUMENTS

| | | | |
|---|---|---|---|
| 5,251,251 A | 10/1993 | Barber et al. | |
| 5,333,180 A | 7/1994 | Brown et al. | |
| 5,448,633 A * | 9/1995 | Jamaleddin et al. | 379/201.02 |
| 5,487,107 A | 1/1996 | Atkins et al. | |
| 5,513,117 A | 4/1996 | Small | |
| 5,592,537 A | 1/1997 | Moen | |
| 5,655,006 A | 8/1997 | Cox et al. | |
| 5,661,781 A | 8/1997 | Dejager | |
| 5,696,908 A * | 12/1997 | Muehlberger et al. | 705/39 |
| 5,719,926 A | 2/1998 | Hill | |
| 5,721,768 A * | 2/1998 | Stimson et al. | 379/114.16 |
| 5,740,229 A | 4/1998 | Hanson et al. | |
| 5,815,561 A | 9/1998 | Nguyen et al. | |
| 5,825,863 A * | 10/1998 | Walker | 379/114.2 |
| 5,828,732 A * | 10/1998 | Gow | 379/88.25 |

(Continued)

FOREIGN PATENT DOCUMENTS
EP    0400911    12/1990
(Continued)

*Primary Examiner* — Gerald Gauthier

(57) ABSTRACT

System and a method for recording a personal greeting associated with a pre-paid telephone calling card. The system and method include and involve a data storage system for storing data corresponding to a pre-paid telephone calling card and a personal greeting. Also included and involved is a pre-paid telephone calling card processing system that is coupled to the data storage system and which is configured to receive a request to record the personal greeting during a setup call over a telephone network and to cause the personal greeting to be recorded for subsequent playback. The pre-paid telephone calling card processing system is also configured to receive a request to make an outbound telephone call in relation to the pre-paid telephone calling card during an access call over the telephone network and to cause the personal greeting to be played back automatically during the access call.

20 Claims, 23 Drawing Sheets

U.S. PATENT DOCUMENTS

| | | | | |
|---|---|---|---|---|
| 5,828,740 A | * | 10/1998 | Khuc et al. | 379/114.2 |
| 5,845,205 A | * | 12/1998 | Alanara et al. | 455/564 |
| 5,854,975 A | * | 12/1998 | Fougnies et al. | 455/408 |
| 5,859,897 A | * | 1/1999 | Furman et al. | 379/88.01 |
| 5,864,604 A | | 1/1999 | Moen et al. | |
| 5,864,606 A | * | 1/1999 | Hanson et al. | 379/88.18 |
| 5,901,284 A | | 5/1999 | Hamdy-Swink | |
| 5,903,636 A | * | 5/1999 | Malik | 379/142.01 |
| 5,909,486 A | * | 6/1999 | Walker et al. | 379/114.11 |
| 5,912,956 A | | 6/1999 | Longo et al. | |
| 5,923,734 A | | 7/1999 | Taskett | |
| 5,946,380 A | * | 8/1999 | Cohen et al. | 379/127.01 |
| 5,953,398 A | * | 9/1999 | Hill | 379/121.04 |
| 5,963,626 A | | 10/1999 | Nabkel | |
| 5,978,452 A | | 11/1999 | Cho | |
| 5,991,380 A | | 11/1999 | Bruno et al. | |
| 6,009,150 A | | 12/1999 | Kamel | |
| 6,047,179 A | * | 4/2000 | Kirby | 455/432.2 |
| 6,137,872 A | * | 10/2000 | Davitt et al. | 379/114.2 |
| 6,222,915 B1 | | 4/2001 | Mueller et al. | |
| 6,327,363 B1 | * | 12/2001 | Henderson et al. | 379/265.01 |
| 6,418,202 B1 | | 7/2002 | Caldwell et al. | |
| 6,754,641 B2 | * | 6/2004 | Kolls | 705/44 |
| 7,145,989 B1 | * | 12/2006 | Bond et al. | 379/76 |
| 2007/0121842 A1 | * | 5/2007 | Bond et al. | 379/114.2 |

FOREIGN PATENT DOCUMENTS

| | | |
|---|---|---|
| GB | 2258584 | 2/1993 |
| GB | 2305577 | 4/1997 |

* cited by examiner

CALLING CARD HAVING AN ASSOCIATED PRE-RECORDED PERSONAL GREETING

RELATED APPLICATIONS

The present application is a continuation of U.S. patent application Ser. No. 09/123,109 filed on Jul. 27, 1998, the contents of which are hereby incorporated by reference.

BACKGROUND OF THE INVENTION

1. Field of the Invention

The present invention relates to systems and methods that are used to facilitate enhanced services related to pre-paid telephone calling cards.

2. Description of the Related Art

It is well known that pre-paid telephone calling cards (hereinafter "pre-paid cards") have become widely used to obtain telephone calling services such as long distance calling services, etc. For example, consumers can purchase pre-paid cards from retail stores and use the same to obtain access to telephone services to call friends and family all over the world. As such, many different kinds of pre-paid telephone calling cards are now available. Consumers can purchase pre-paid telephone calling cards having a variety of calling options (domestic calling options, international calling options, etc.) and a wide selection of pre-paid values. For example, consumers can purchase domestic-use calling cards that are charged with 100 domestic call units (i.e., a unit is typically equal to one telephone service minute, but may be associated with some other amount of time—e.g., 50 seconds, etc.).

The appeal of pre-paid cards to consumers is due in large part to the fact that pre-paid telephone calling cards often allow consumers to realize savings associated with making telephone calls. For example, pre-paid telephone calling cards often allow consumers to avoid the costs associated with using a conventional telephone calling card that is associated with a particular telephone line (e.g., an access call service charge that is added to other toll-call rates and charges). As a result of their appeal, many retailers have begun to offer and sell pre-paid cards. Since a relatively large selection of pre-paid telephone calling cards can be stocked and displayed without requiring significant retail floor space, retailers can enjoy maximized revenues relative to small sections of their leased or owned storefronts.

Despite the appeal of pre-paid cards to both users and retailers, such market acceptance has created serious problems for providers of pre-paid cards and related telephone services. In particular, providers of pre-paid cards have been forced to distinguish their products in order to effectively compete. To date, the only effective way to distinguish one's pre-paid cards has been to continuously lower telephone service rates to the point of extremely thin or negative margins. And, unfortunately, pre-paid cards that promise the "lowest" telephone service rates often are not sufficient to capture and retain pre-paid card customers.

Thus, there exists a need to provide systems and methods that will allow providers of pre-paid cards to offer enhanced services in relation to their pre-paid cards without requiring providers to lower their telephone service rates to unreasonable levels. To be viable, such systems and methods must allow users of pre-paid cards to easily take advantage of such enhanced services while, at the same time, using pre-paid cards to obtain conventional telephone calling services.

SUMMARY OF THE INVENTION

The present invention solves the above-described problems associated with prior pre-paid telephone calling cards by providing systems and methods that facilitate the provisioning, processing, and use of enhanced services.

By providing such systems and methods, providers of pre-paid telephone calling cards will be able to effectively compete in the pre-paid card marketplace by offering better, more feature-rich services on which consumers will come to enjoy and rely. In particular, such systems and methods may be used to provide enhanced services to card purchasers who wish to pre-record personal greetings or messages to be associated with pre-paid telephone calling cards intended as gifts for individual recipients. For example, such a personal greeting or message may be played back automatically to a card user during a first use of a pre-paid telephone calling card.

As such, in accordance with an aspect of the present invention, provided is a system and a method for recording a personal greeting associated with a pre-paid telephone calling card. The system and method include and involve a data storage system for storing data corresponding to a pre-paid telephone calling card and a personal greeting. Also included and involved is a pre-paid telephone calling card processing system that is coupled to the data storage system and which is configured to receive a request to record the personal greeting during a setup call over a telephone network and to cause the personal greeting to be recorded for subsequent playback.

According to another aspect of the present invention, provided is a system and a method for facilitating the use of a pre-paid telephone calling card that has an associated pre-recorded personal greeting. The system and method include and involve a data storage system that stores data corresponding to a pre-paid telephone calling card and to a personal greeting. Also included and involved is a pre-paid telephone calling card processing system that is coupled to the data storage system and which is configured to receive a request to make an outbound telephone call in relation to the pre-paid telephone calling card during an access call over a telephone network and to cause the personal greeting to be played back automatically during the access call.

BRIEF DESCRIPTION OF THE DRAWINGS

The present invention is described in detail below with reference to the following drawing figures, of which.

DETAILED DESCRIPTION OF THE PREFERRED EMBODIMENTS

Figure 1:
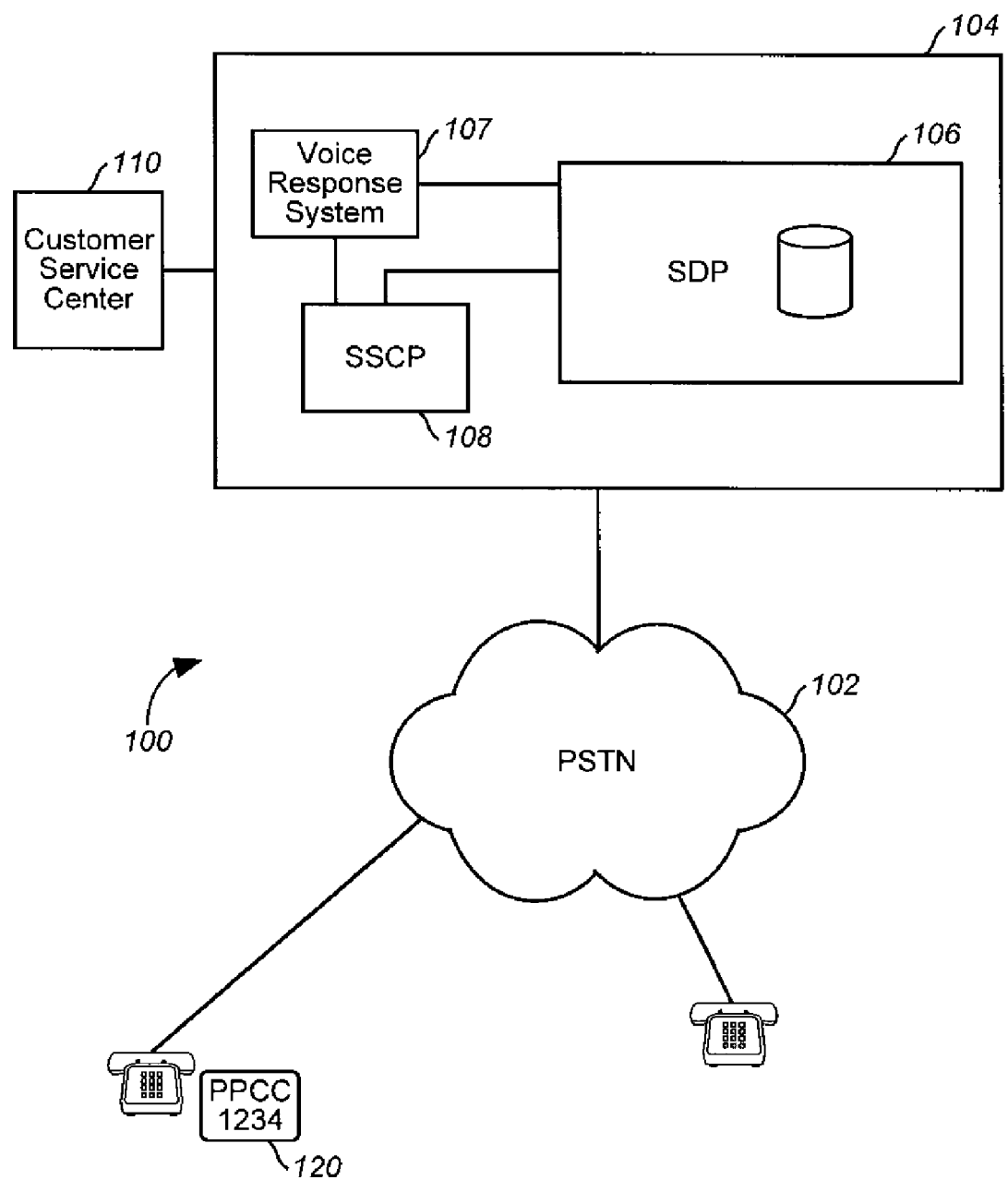
FIG. 1 is a diagram of a system in which enhanced services may be provided in conjunction with pre-paid calling cards according to a preferred embodiment of the present invention.

The present invention is now discussed in detail with reference to the drawing figures that were briefly described above. An overview section is followed by a discussion of the structural aspects of the present invention and a discussion of corresponding data and call flows. Unless otherwise indicated, like parts, systems, and processes are referred to with like reference numerals.

Overview

The present invention is concerned with providing systems and methods that may be used to provide enhanced pre-paid telephone calling card services and features. Such enhanced services and features include and involve systems and methods that are provided by the present invention to deliver pre-paid telephone calling cards (hereinafter "pre-paid cards") having associated pre-recorded personal greetings. With such enhanced pre-paid cards and related services, people will be able to pre-record and play-back personal greetings intended for particular recipients. That is, the present invention will allow data stored in relation to a particular pre-paid card to include or point to a pre-recorded message that may be played back to a card user at a later time (e.g., upon first use/first access call related to a pre-paid card, etc.). As such, the present invention will allow a purchaser of a pre-paid card ("card purchaser") to record a personal greeting (e.g., "HAPPY BIRTHDAY—MY SON. ENJOY YOUR PRE-PAID CARD," etc.) and then give the pre-paid card to a recipient ("card user") who will hear the pre-recorded personal greeting when the card user accesses a pre-paid card system to make an outbound telephone call. As such, the present invention provides a new pre-paid card that may be purchased and given to recipients as gifts and the like.

To facilitate the provisioning of a pre-paid card that is to have an associated pre-recorded personal greeting, the present invention includes two phases of operation that are discussed in detail below with regard to FIGS. 1, 2A-2G and 3A-3O, respectively. A first phase involves pre-paid card activation and feature setup, while a second phase includes card use. The first phase, pre-paid card activation and feature setup, involves the actions of a seller of pre-paid cards in conjunction with the actions of a service provider who is responsible for managing systems to support pre-paid card use. Pre-paid card feature setup involves the actions of a card purchaser who, by way of the present invention, is now able to initiate a setup call to a pre-paid card processing system to pre-record a personal greeting to be associated with a particular pre-paid card and which may be intended for a particular recipient (e.g., a particular card user).

The aforementioned second phase, card use, may involve the actions of another party (e.g., a card user) who seeks to make a telephone call through use of a pre-paid card (or someone who seeks to receive the benefit of some other pre-paid card related service—e.g., pre-paid network service such as pre-paid Internet access, pre-paid cellular service, etc.). A card user, now may hear the card purchaser's pre-recorded message or personal greeting upon use (e.g., upon a first use, etc) of the pre-paid card. The pre-recorded message may be a message recorded by the card purchaser during the aforementioned card setup call via a telephone network, for example. Also, the pre-recorded message may be played any number of times (e.g., one or more times), for example, upon a first use of the pre-paid card by the card user.

Structural Aspects of the Present Invention

To deliver the aforementioned enhanced services/features and, in particular, the ability to record and playback personal greetings associated with pre-paid cards, the present invention utilizes systems and corresponding processes which are now described. In particular, the structural aspects of the present invention are described with reference to FIG. 1. Depicted in FIG. 1 is a system which supports enhanced pre-paid cards such as those that may be set up to have associated pre-recorded personal greetings and messages in accordance with the present invention as discussed above. In particular, system 100 includes a calling party (e.g., having telephone number 301-993-1234), a called party (e.g., having telephone number 972-918-1244), the publicly switched telephone network (PSTN) 102, a pre-paid telephone calling card processing system 104 such as one including at least one intelligent network platform having one or more service data points (SDP) 106, at least one service switching control point (SSCP) 108, the functionality of which may be dispersed among multiple systems or components, and a customer service center 110 which may be attended by live operators. In FIG. 1, calling party (e.g., a card purchaser, card user, etc.) may use a prepaid card 120 to obtain enhanced pre-paid telephone calling card services in accordance with the present invention (e.g., telephone call and pre-recorded message/personal greeting services).

Also included within pre-paid telephone calling card processing system 104 is a voice response system 107 which may be used to automatically voice prompts and/or recorded messages/personal greetings in accordance with the present invention via a telephone call (e.g., a setup call during which a personal greeting may be recorded, an access call during which a personal greeting may be played back automatically) over a telephone network such as the PSTN 102. The use of such voice response systems will be readily apparent and understood by those skilled in the art. It should also be noted that voice response system 107 may be configured to actually store message content (e.g., digital data, etc.) related to a pre-recorded personal greeting to be associated with pre-paid card 120. That is, voice response system 107 may include and/or operate with a voice data storage system (e.g., one similar or like a voice mail storage system) to record personal greetings associated with pre-paid cards in accordance with the present invention (e.g., a personal greeting may be stored in a manner similar or like a voice mail message, etc.). The ultimate voicing of the message that may incorporate a personal greeting from a card purchaser to a card user, may be voiced over a telephone call connection initiated by the card user via voice response system 107 in response to appropriate instructions from SSCP 108, and in relation to message data addressable thereby (e.g., stored within a data storage facility or system). The use of a voice response system to facilitate voicing of digitally recorded voice sequences will be readily understood by those skilled in the art.

System 100 facilitates both card setup by a card purchaser, for example, and card use by a card user. A pre-paid calling card like pre-paid calling card 120 may be used to obtain long-distance telephone service or other services which may be offered in conjunction with a pre-paid type card (e.g., pre-paid Internet service, pre-paid cellular telephone service, etc.).

As noted above, pre-paid telephone calling card processing system 104 is one that includes at least one intelligent network platform consisting of, among other things, SSCP 108 and SDP 106. As such, a card purchaser of pre-paid calling card 120 may access SSCP 108 via PSTN 102 to affect database records related to pre-paid calling card or pre-paid card 120 in accordance with the present invention. In particular, a card purchaser may setup pre-paid card 120 by recording a greeting or message to be played back automatically upon (e.g., a first use) use of pre-paid card 120 by a card user (a gift recipient of a card purchaser). Data related to pre-paid card 120 may be stored in SDP 106. Such data may include card usage data such as remaining minutes, unit billing rates, and, according to the present invention, message information related to a personal greeting that may be stored in relation to pre-paid card 120 and played, for example, upon first use of pre-paid card 120 by a card user. Such message information may include, for example, digitally recorded message content data, pointer data such as file names corresponding to message content stored in a particular, corresponding file etc. which point to digitally recorded message data within storage facilities etc.

A card purchaser of pre-paid card 120 may cause data related to pre-paid card 120 to be affected via a live operator session handled through customer service center 110. The facilities to support use of a customer service call center, ultimately to support pre-paid cards in accordance with the present invention will be readily apparent to those skilled in the art.

Once pre-paid card 120 has been setup in accordance with the present invention (e.g., caused to be associated with a recorded personal greeting to be played upon use of pre-paid card 120, etc.), a card user may place a pre-paid telephone calling card call in a conventional way (e.g., by dialing a 1-800 access number and entering an appropriate card identified such as a PIN/CARD ID number to obtain long distance telephone service, etc. In accordance with the present invention, however, a pre-recorded message (e.g., one pre-recorded by a card purchaser, etc) may be played automatically via pre-paid telephone calling card processing system 104 to a card user prior to completing an outbound long distance or other telephone call (or other service request). Such a personal greeting may be one from a parent to a child such as "HAPPY BIRTHDAY MOLLY, I HOPE YOU ENJOY YOUR BIRTHDAY GIFT—YOUR VERY OWN PRE-PAID TELEPHONE CALLING CARD."

A telephone call desired by a calling party (e.g., by a card user) may be placed from a calling party station such as one having telephone number 301-993-1234 to a called party having a telephone terminal station identified at telephone number 972-918-1244.

Pre-Paid Card Activation and Setup

The structural aspects of the present invention as described above and as shown in FIG. 1, are designed to operate together to facilitate the phases of operation that were discussed in the OVERVIEW section hereof. In particular, the structures depicted in FIG. 1 which make up system 100 are configured to support both pre-paid card activation and set-up as a first phase of operation and card use, as a second phase of operation in accordance with the present invention. Pre-paid card activation involves the operations related to data stored for pre-paid card 120 that may be stored in SDP 106 (FIG. 1). Such activation operations, include but are not limited to, card activation, deactivation, re-charge of remaining minutes, etc. and in particular, Point-of-sale activation of the same are intended to place a pre-paid card like pre-paid card 120 into an active, ready-for use state. Pre-paid card activation may occur via a point-of-sale operation, a telephone session with a live operator, etc. An exemplary system to provide for activation operations related to pre-paid calling cards and is shown in co-pending U.S. patent application Ser. No. 09/089,815 entitled "POINT OF SALE ACTIVATION AND DEACTIVATION OF PRE-PAID TELEPHONE CALLING CARDS," which is commonly assigned and incorporated herein by reference. The systems and call flows illustrated within the aforementioned, co-pending United States Patent Application may be used to activate and deactivate (and otherwise affect data stored within SDP 106) to render a particular pre-paid card such as pre-paid card 120 ready-for-use (e.g., make pre-paid card ready for initiation of outbound telephone calls such as long distance calls) by a card user. And, in particular, such activation systems and call flows may be used to ready a card for use by a card user in accordance with the present invention.

After a card has been activated as described above, the card may be setup in accordance with the present invention. In particular, a pre-paid card may be setup by causing a personal greeting to be recorded in relation to data stored for a pre-paid card such as pre-paid card 120. Upon use in accordance with a use phase related to the present invention, such a pre-recorded personal greeting may be played or voiced automatically to a card user who may be a recipient of a pre-paid card as a gift or otherwise.

The operations and call flows within a system like or similar to system 100 (FIG. 1) are illustrated in FIGS. 2A-2G. Such operations are self-explanatory, but are discussed herein to further illustrate the novel aspects of the operations that may occur within the present invention.

Figure 2A:
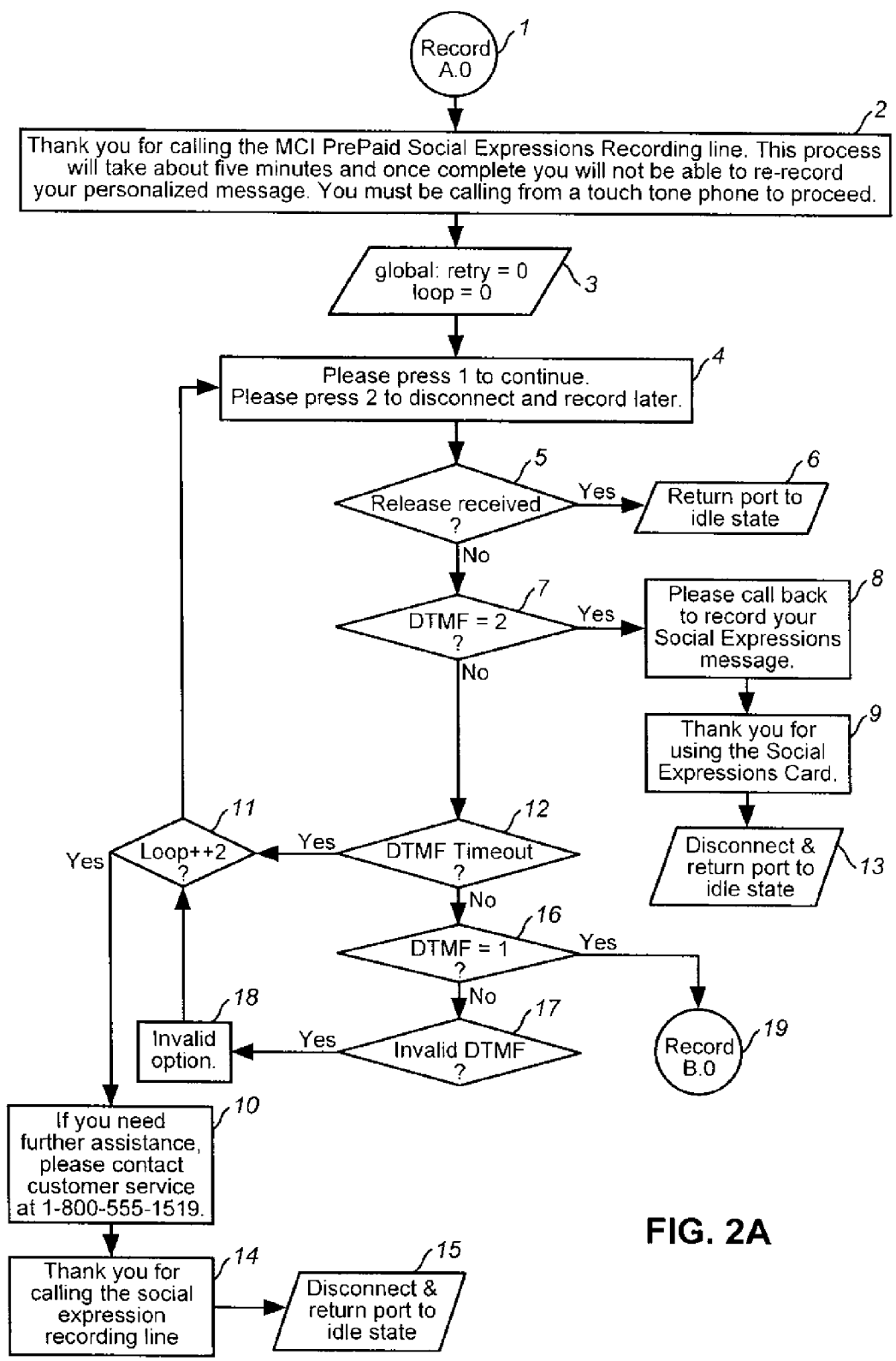
FIG. 2A is a call flow diagram that illustrates pre-paid telephone calling card set-up operations in accordance with a preferred embodiment of the present invention.

Referring now to FIG. 2A, depicted therein is a pre-paid card setup call flow, and, in particular, one that supports the recordation of a personal greeting via a sequence that may be performed by a card purchaser for later play back to a card user. In FIG. 2A, a card purchaser or other calling party likely will access a pre-paid telephone calling card processing system via a telephone call (e.g., a setup call) through a network such as the PSTN 102 through use of a toll-free access number (e.g., a 1-800 access number). After initiating such a setup telephone call, a voice response system such as voice response system 107 voices a prompt during the setup telephone call to the calling party as indicated at step 2 in FIG. 2A. Thereafter, at step 3, internal variables to control looping and the like are set or otherwise initialized. Thereafter, at steps 4, 5, 6, 7, 8, 9, 11, 12, 13, 16, 17, 18, and 19, the calling party will be prompted to enter a DTMF sequences such as "1" to continue or "2" to disconnect, and also to record a personal greeting. If the calling party can not respond or does not respond in an appropriate way such as through proper entry of an appropriate DTMF code, processing may end at steps 10, 14, and 15, which ultimately return a call port associated with pre-paid telephone calling card processing system 104 to an idle state.

If, at step 16 it is determined that the calling party intends to record a personal greeting for later playback to a card user in accordance with the present invention, processing proceeds at the top of FIG. 2B and, in particular, at step 19 thereof.

Figure 2B:
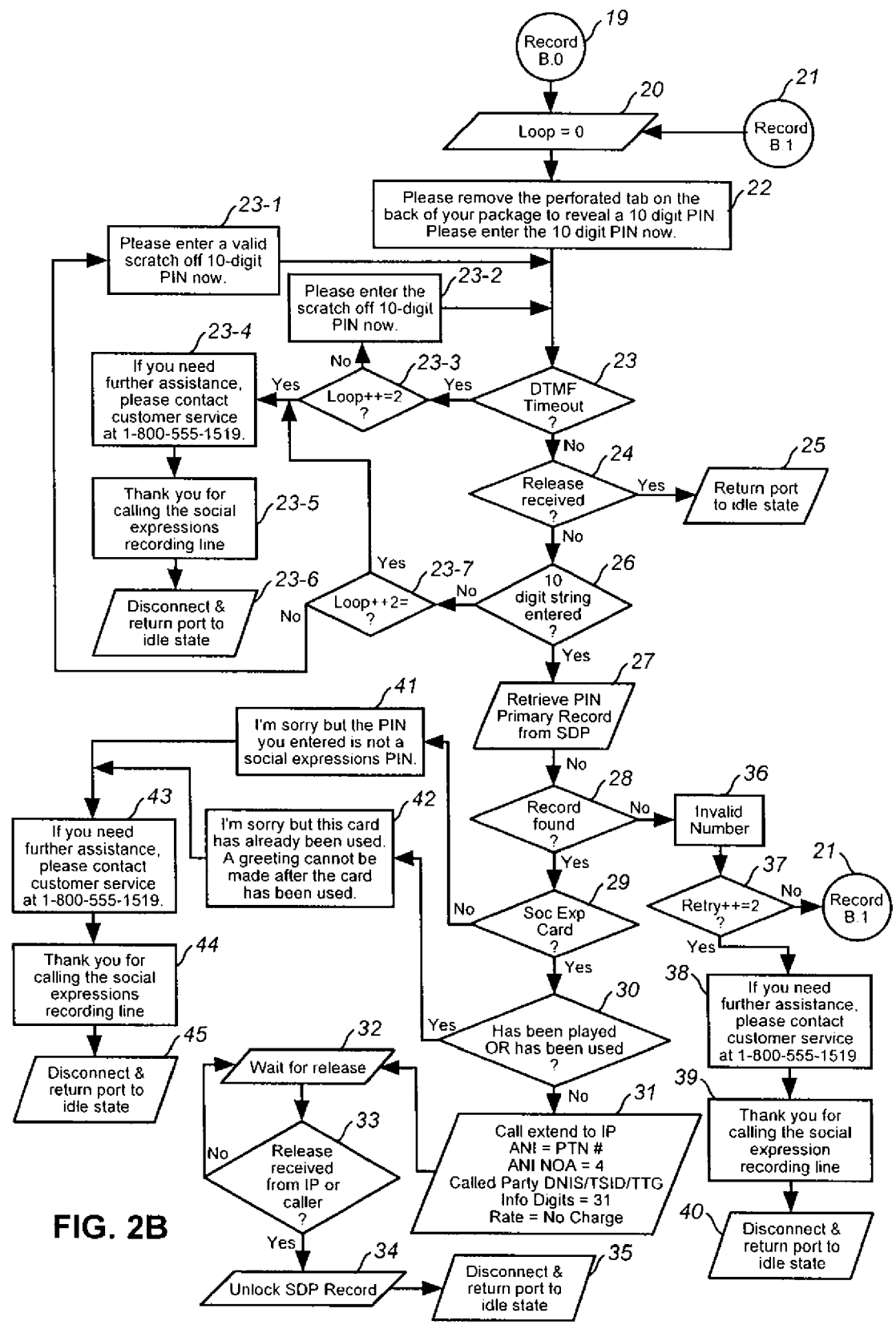
FIG. 2B is a continuation call flow diagram of the call flow diagram started in FIG. 2A.

Processes depicted in FIG. 2B includes steps 20, 21, 22, 23, 23-1-23-7 and 24-45. The depicted operations are those that may be carried out by pre-paid telephone calling card processing system 104 to establish a database session relative to a particular pre-paid card such as pre-paid card 120. Such a database session would involve processing related to data stored in SDP 106 in regard to pre-paid card 120. The operations depicted in FIG. 2B are self-explanatory and will be immediately understood by those skilled in the art after careful review of the same.

It is important to note, that at step 31 a call session may be made via SSCP 108 and SDP 106 to a voice response system such as voice response system 107 to allow recording of a personal greeting in relation to pre-paid card 120. Such a call session to an intelligent platform such as voice response system 107 may be carried out in the form of SS7 based communications as indicated by the instructions and variable settings illustrated at step 31. In particular, the ANI (automatic number identifier) on the call out to the voice response system such as voice response system 107, will be set to be equal to a PIN or PIN Tracking Number associated with and/or corresponding to pre-paid card 120 (e.g., a card identifier to uniquely identify pre-paid card 120 data as stored in SDP 106 and all other peripherals that may be used to store and/or process data (including personal greeting data) in accordance with the present invention, and may be found physically imprinted, otherwise placed on or printed on pre-paid calling card 120, or stored in a database within SDP 106. The call session to voice response system 107 is further illustrated in FIGS. 2C-2G to which reference is now made.

Figure 2C:
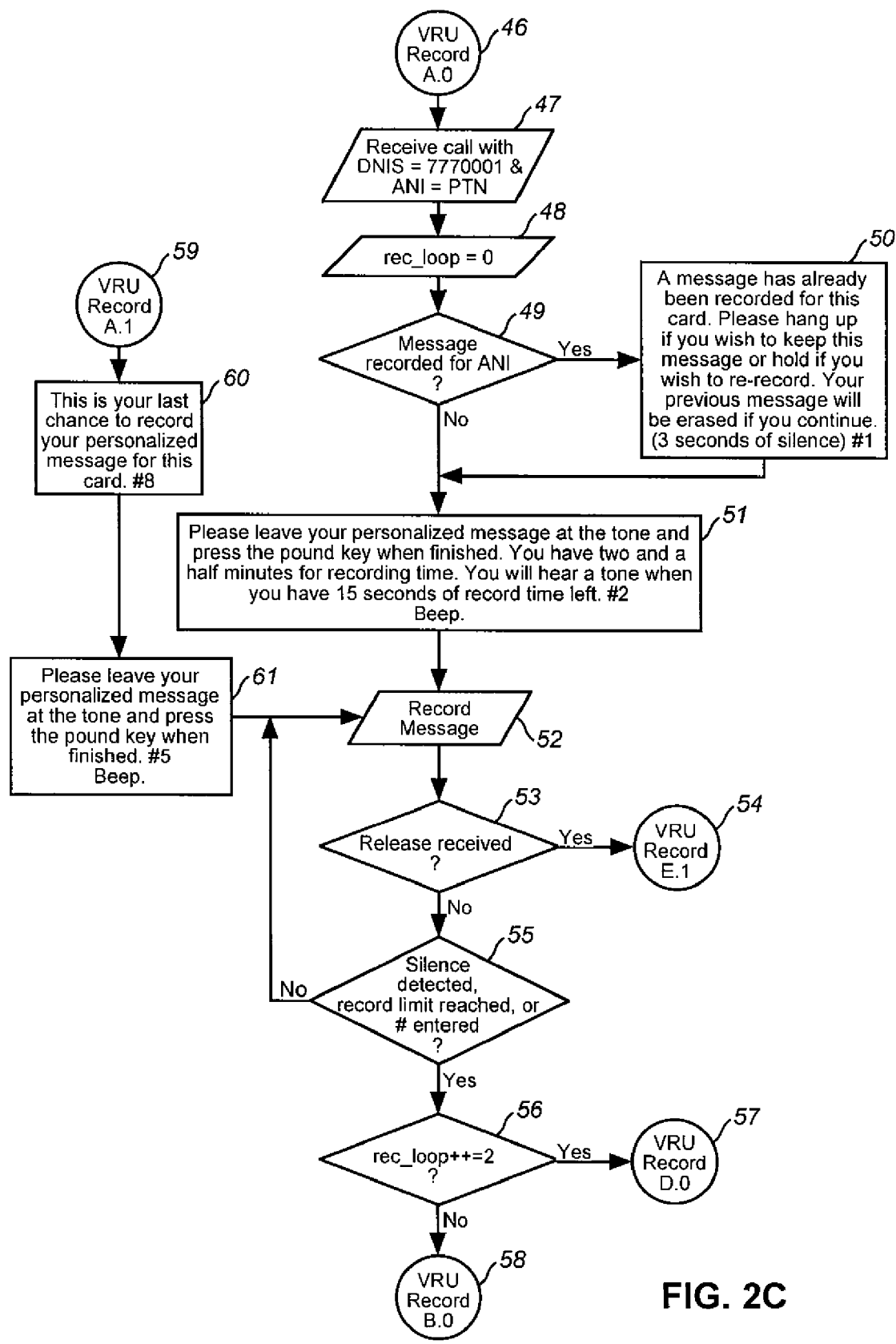
FIG. 2C is a continuation call flow diagram of the call flow diagram started in FIGS. 2A and 2B.

Referring now to FIG. 2C, depicted therein is a voice response system call flow diagram that illustrates the steps carried out to record a personal greeting to be associated with a particular pre-paid calling card such as pre-paid calling card 120 (FIG. 1). FIG. 2C includes steps 46-61. Those skilled in the art will immediately understand the process steps illustrated in FIG. 2C after review of the same. It is important to note, however, that the received call initiated by SSCP 108 will be received by a voice response system such as voice response system 107 with the ANI set to either a PIN Tracking Number or PIN associated with a pre-paid calling card which may be imprinted or otherwise placed on pre-paid calling card 120 and stored in SDP 106, etc. Accordingly, the key to any recorded message processed and stored by a voice response system such as voice response system 107 may be keyed or based upon the ANI which has been set in accordance with the PIN tracking number or other PIN type number. At steps 50 and 51, messages may be voiced by a voice response system such as voice response system 107 to the calling party (a card purchaser) who is engaging in a pre-paid card setup sequence related to his particular pre-paid calling card. The sequence of operations carried out at steps 59-61 are arrived at in later process operations depicted in FIG. 2D-2G. The flow of operations and, in particular, the call flow related thereto as illustrated in FIG. 2C will be readily apparent to those skilled in the art after careful review of the same.

Figure 2D:
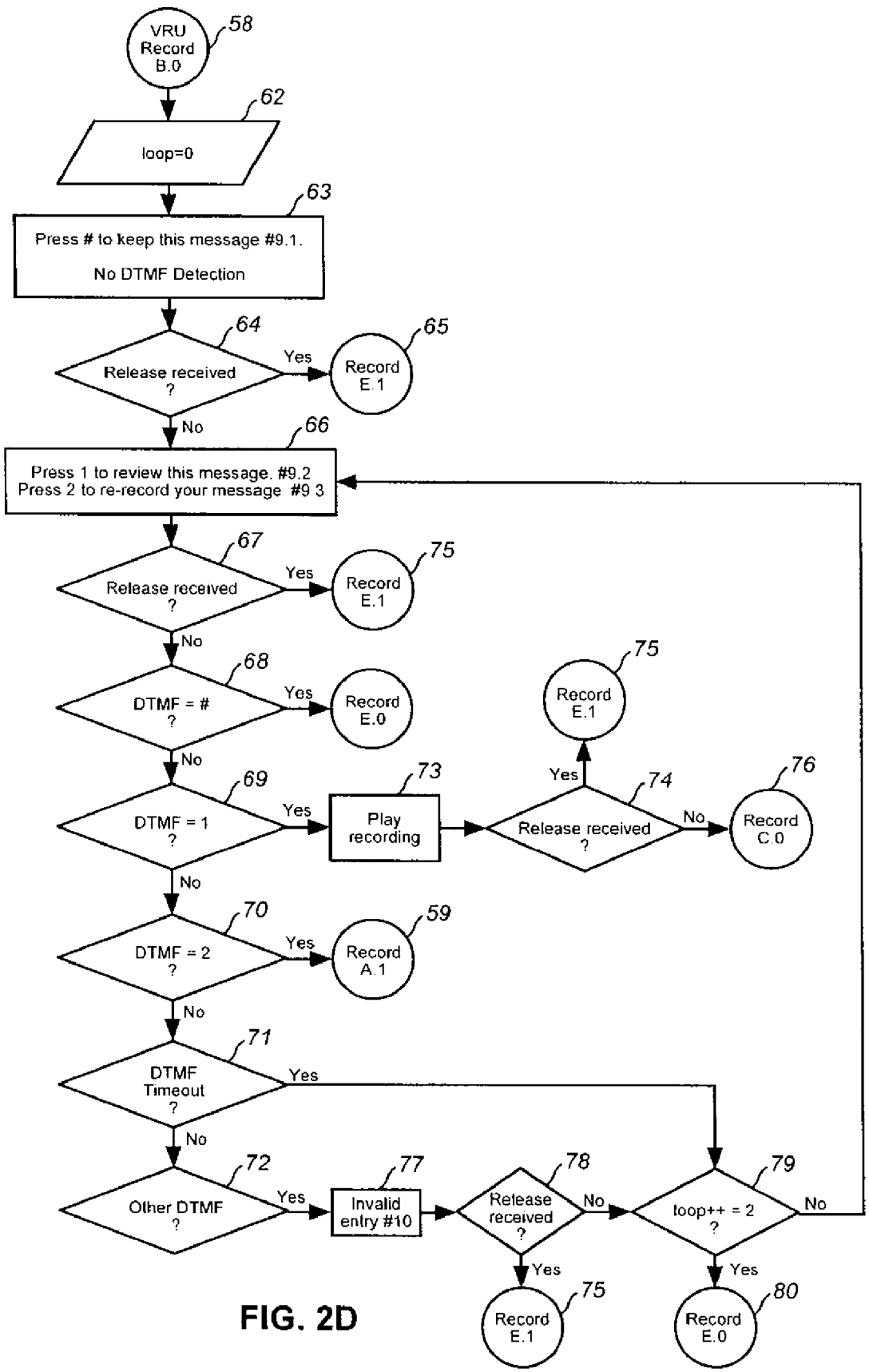
FIG. 2D is a continuation call flow diagram of the call flow diagram started in FIGS. 2A-2C.

Referring now to FIG. 2D, depicted therein is the continuation of the call flow for recordation of a personal greeting. In particular, within FIG. 2D, steps 62-80 are illustrated. In FIG. 2D, a calling party's recorded message (as recorded at step 52 in FIG. 2C) is to undergo scrutiny by the calling party as indicated within FIG. 2D. That is, the calling party will be prompted and appropriate logic will be executed relative to weather the calling party desires to keep his message as a personal greeting to be associated with pre-paid calling card 120. Through a combination of voiced prompts and responses entered by the calling party through DTMF entry (telephone keypad entry) the calling party may re-record or otherwise play-back his recording for review purposes and/or release from the setup call thereby leaving the calling party's recorded message as the personal greeting to be associated with pre-paid calling card 120.

Figure 2E:
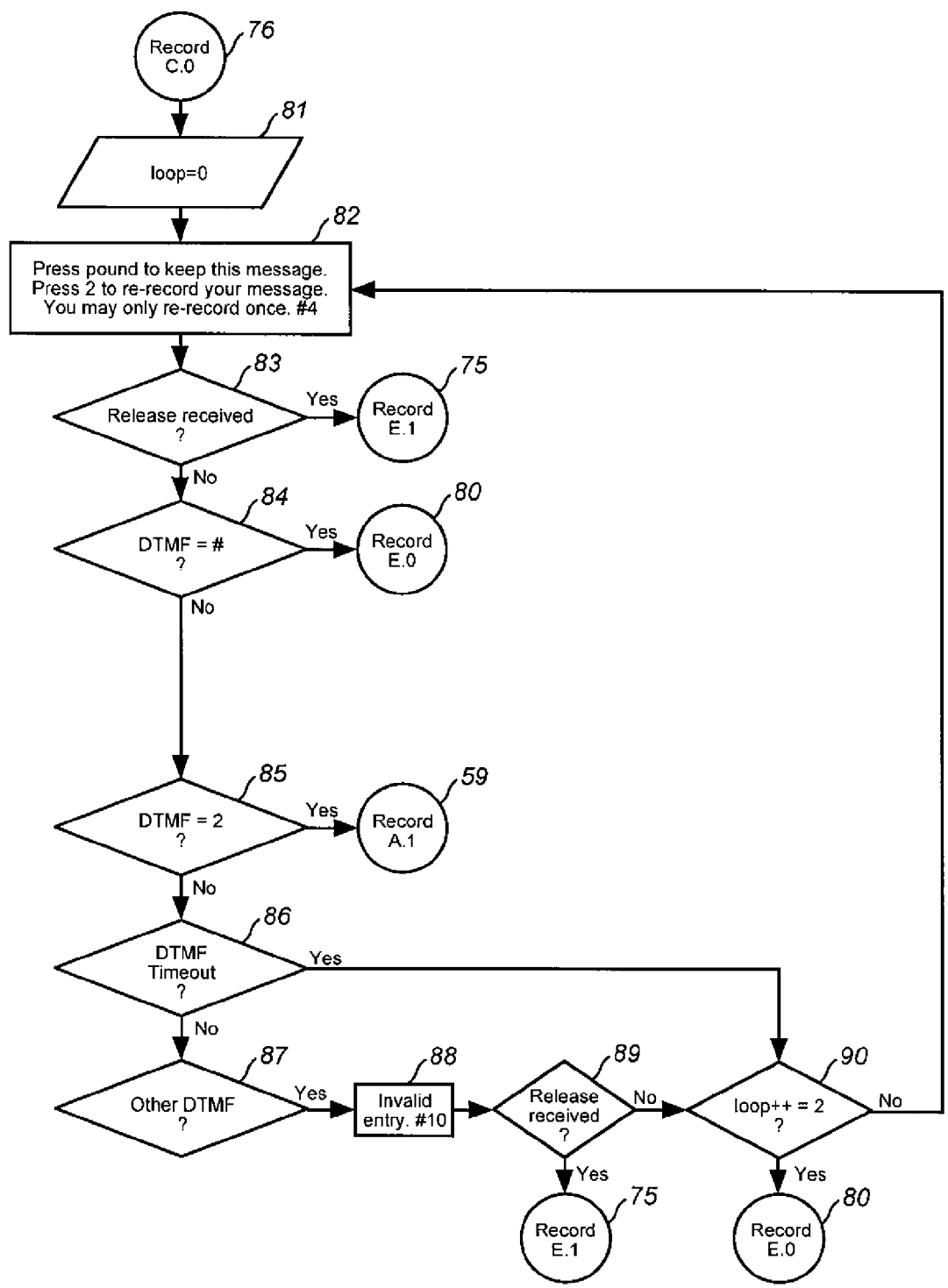
FIG. 2E is a continuation call flow diagram of the call flow diagram started in FIGS. 2A-2D.

If at step 69, the calling party intends to play the recording for review purposes, and a call release has not been detected at step 74, processing proceeds at the top of FIG. 2E and, in particular, at step 76.

In FIG. 2E, a looping construct is initiated to prompt the calling party to either keep his personal greeting as earlier recorded at step 52 (FIG. 2C), or otherwise re-record his personal greeting. The logic depicted in FIG. 2E will be readily apparent to those skilled in the art after careful review of the same. And, in particular, the operations carried out at steps 76-81 will be immediately understood after careful inspection of FIG. 2E.

Figure 2F:
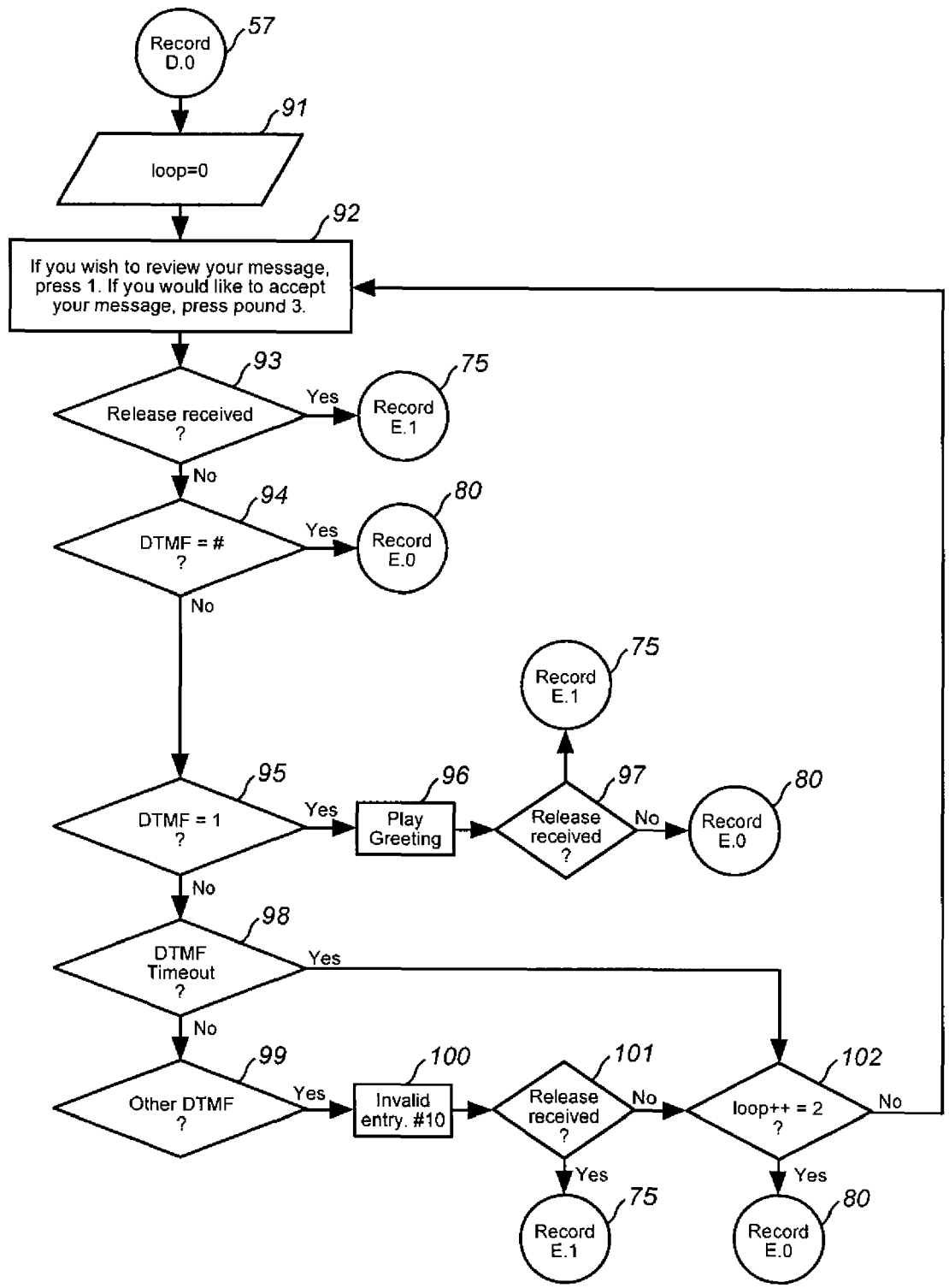
FIG. 2F is a continuation call flow diagram of the call flow diagram started in FIGS. 2A-2E.

Referring now to FIG. 2F, depicted therein is a sequence of operations including steps 91-102. The operations depicted in FIG. 2F include a looping construct related to prompting a user to enter certain DTMF sequences (e.g., number 1 and 3 keys followed or preceded by the pound key on a conventional telephone key pad) to either review earlier recorded messages or accept a message and recordation of a personal greeting. Process steps carried out within FIG. 2F are arrived at from step 57 as illustrated in FIG. 2C. The sequence of operations and the particular functions carried out within the process steps illustrated in FIG. 2F will be immediately apparent to those skilled in the art after careful review of the same.

Figure 2G:
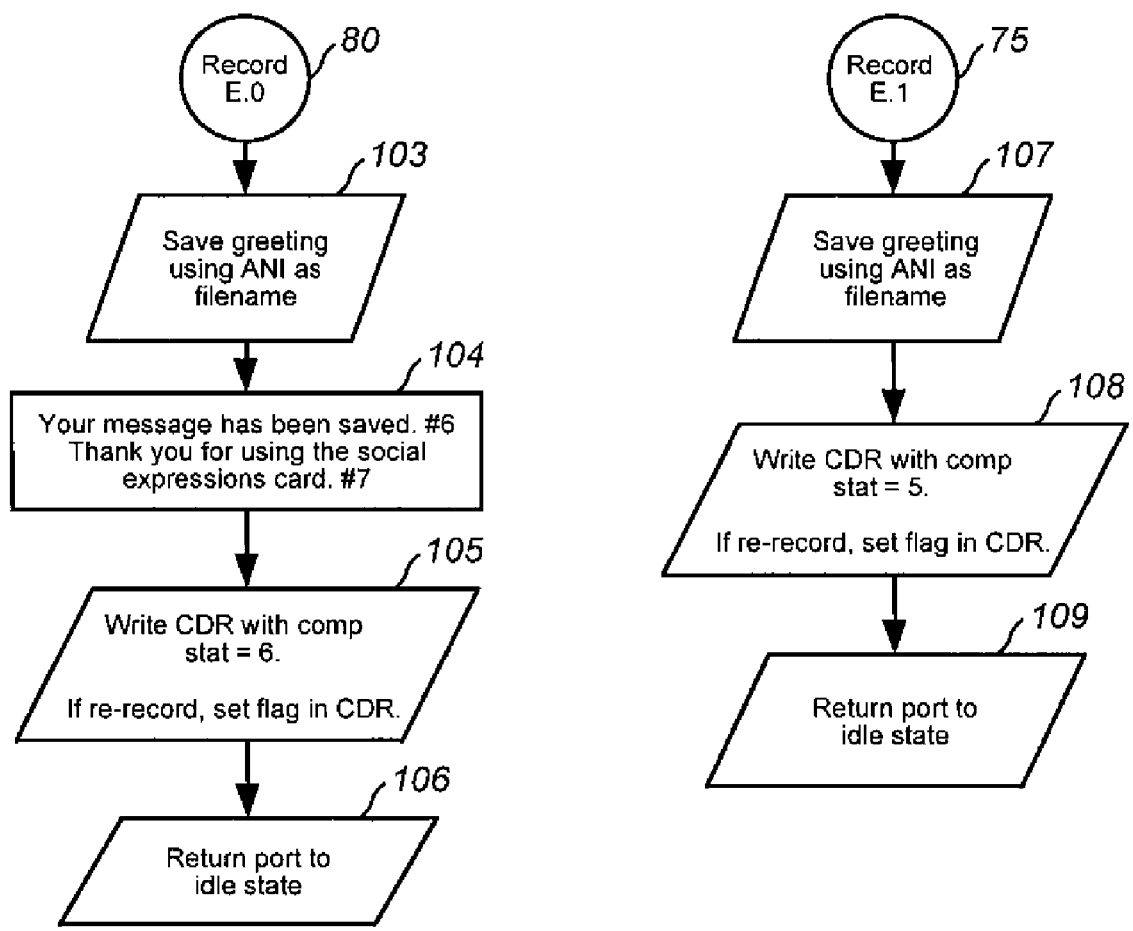
FIG. 2G is the conclusion to the call flow diagram started in FIGS. 2A-2F.

Referring now to FIG. 2G, depicted therein are two terminal call flow sequences for personal greeting recordation which may be arrived at via process steps indicated in FIGS. 2D, 2E, and 2F as illustrated and discussed above. The call flow commencing at step 80 will save a recorded personal greeting using the ANI as the file name and wilt prompt the calling party (e.g., card purchaser) with a voiced response indicating that the personal greeting or message has been saved (also referred to as a social expression relative to a particular pre-paid calling card such as pre-paid calling card 120 as indicated in the call flows as FIGS. 2A-2G). Such recordation and file naming may be done within SDP 106 and/or with voice response systems like or similar to system 107. At step 105, a call detail record will be written with a completion status flag set to be equal to the number "6" (other completion status flag identifiers may be used depending on particular design requirements). Finally, the port on the voice response system (e.g., voice response system 107) will be set to an idle state and a return will be made to corresponding process flows in the call flow sequences illustrated in FIGS. 2C, 2D, 2E and 2F, respectively. The process and call flows commencing at step 75 in FIG. 2G will be arrived at as indicated in FIGS. 2D, 2E, and 2F, respectively. That is, the process flow depicted at steps 107 through 109 will commence if a caller (e.g., a card purchaser) releases or otherwise terminates his call or enters invalid DTMF sequences in response to reviewing messages, etc. Such operations will be immediately understood by those skilled in the art after carefully reviewing the call flow illustrated in FIG. 2G.

Pre-Paid Card Use

The aforementioned discussions related to pre-paid card setup in accordance with the present invention as exemplified in FIGS. 2A-2G, involved card activation (e.g., at a point-of-sale station via a point-of-sale (POS) controller system, etc.) and setup by a card purchaser in recording a personal greeting that may be associated with a particular pre-paid calling card. After a card purchaser records such a personal greeting, the card purchaser may thereafter distribute the card to a recipient of his or her choice. For example, a parent may record a personal greeting related to a pre-paid card and then give that pre-paid card with all minutes remaining or associated with that card for telephone service to a child on his or her birthday. Upon use of the card (e.g., upon first use) the child may hear the pre-recorded message (e.g., "HAPPY BIRTHDAY JOHNNY") from the parent prior to completing a desired telephone call which is to be initiated by the child.

Figure 3A:
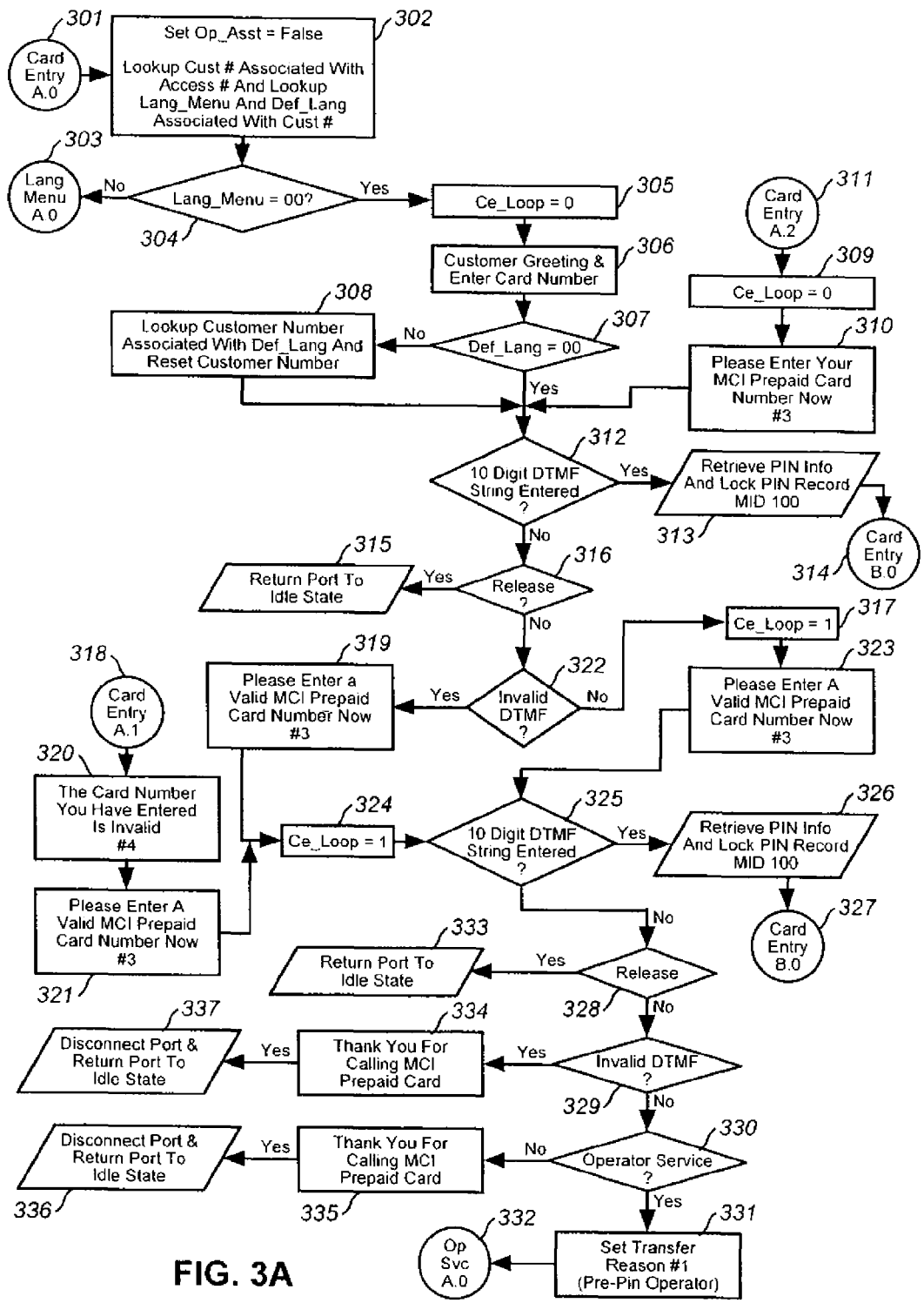
FIG. 3A is a call flow diagram that illustrates the operations carried out within the system depicted in FIG. 1 to allow use of a pre-paid telephone calling card and, in particular, one having an associated pre-recorded personal greeting in accordance with a preferred embodiment of the present invention.
Figure 3B:
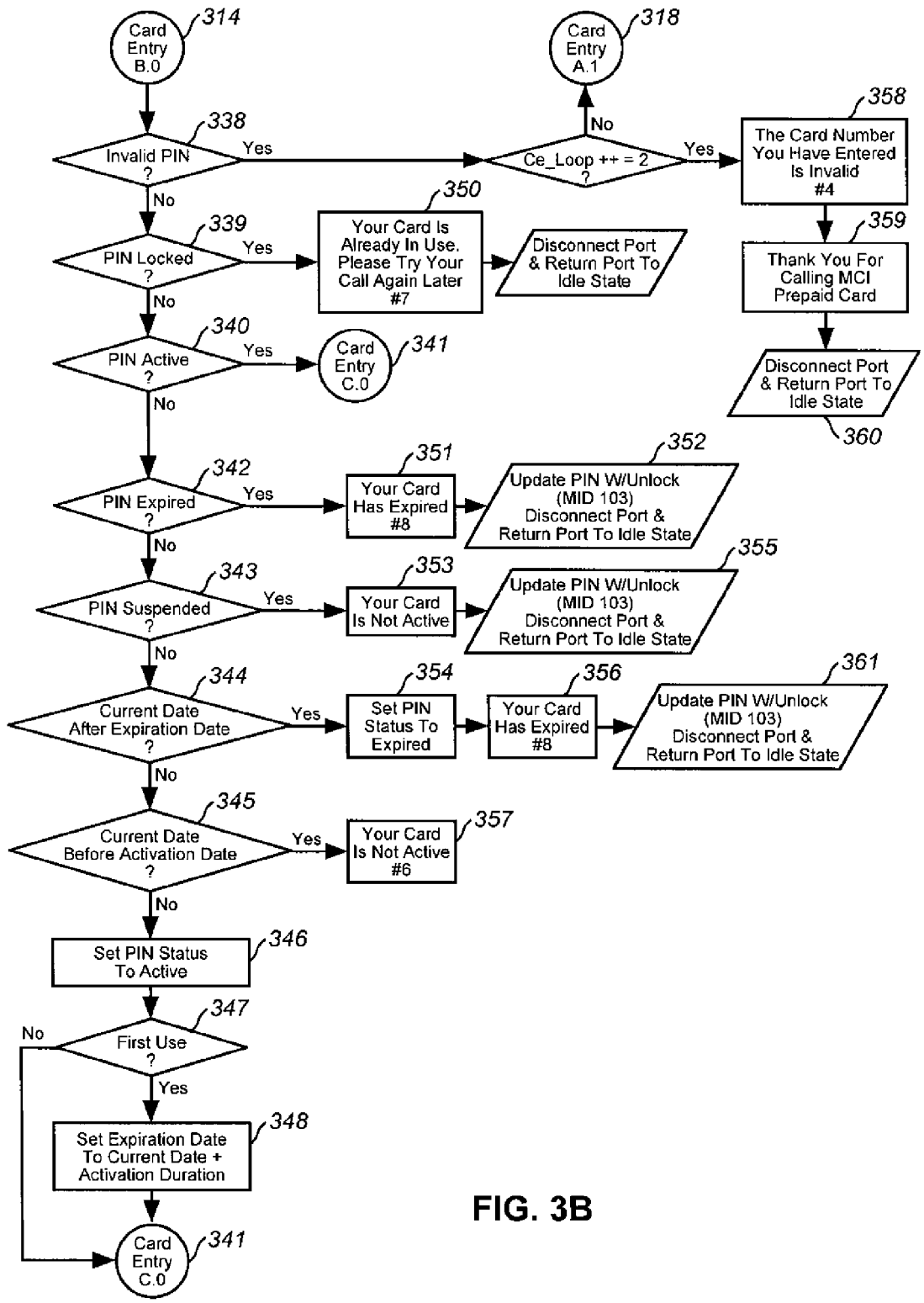
FIG. 3B is a continuation call flow diagram of the call flow diagram started in FIG. 3A.
Figure 3C:
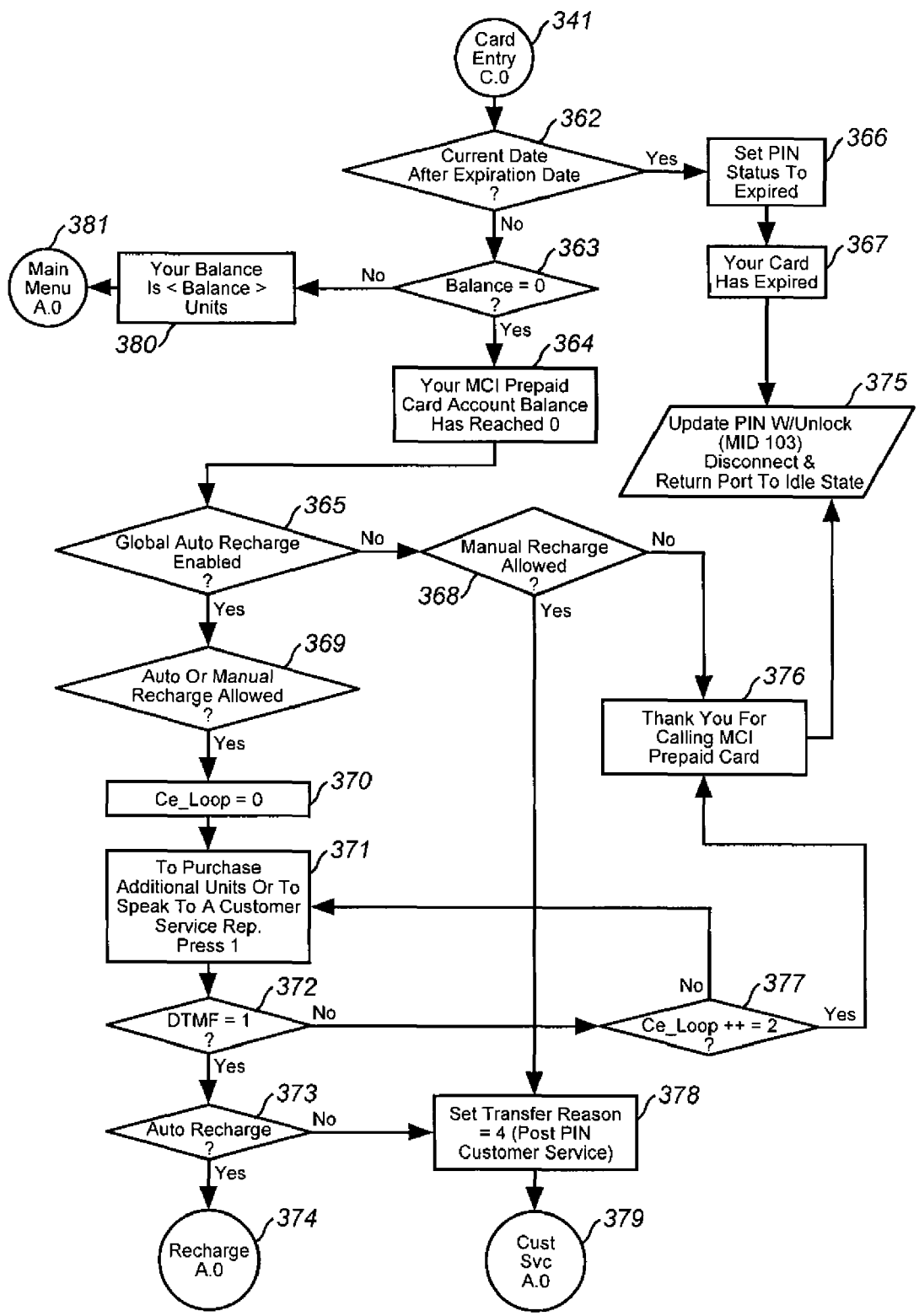
FIG. 3C is a continuation call flow diagram of the call flow diagram started in FIGS. 3A and 3B.
Figure 3D:
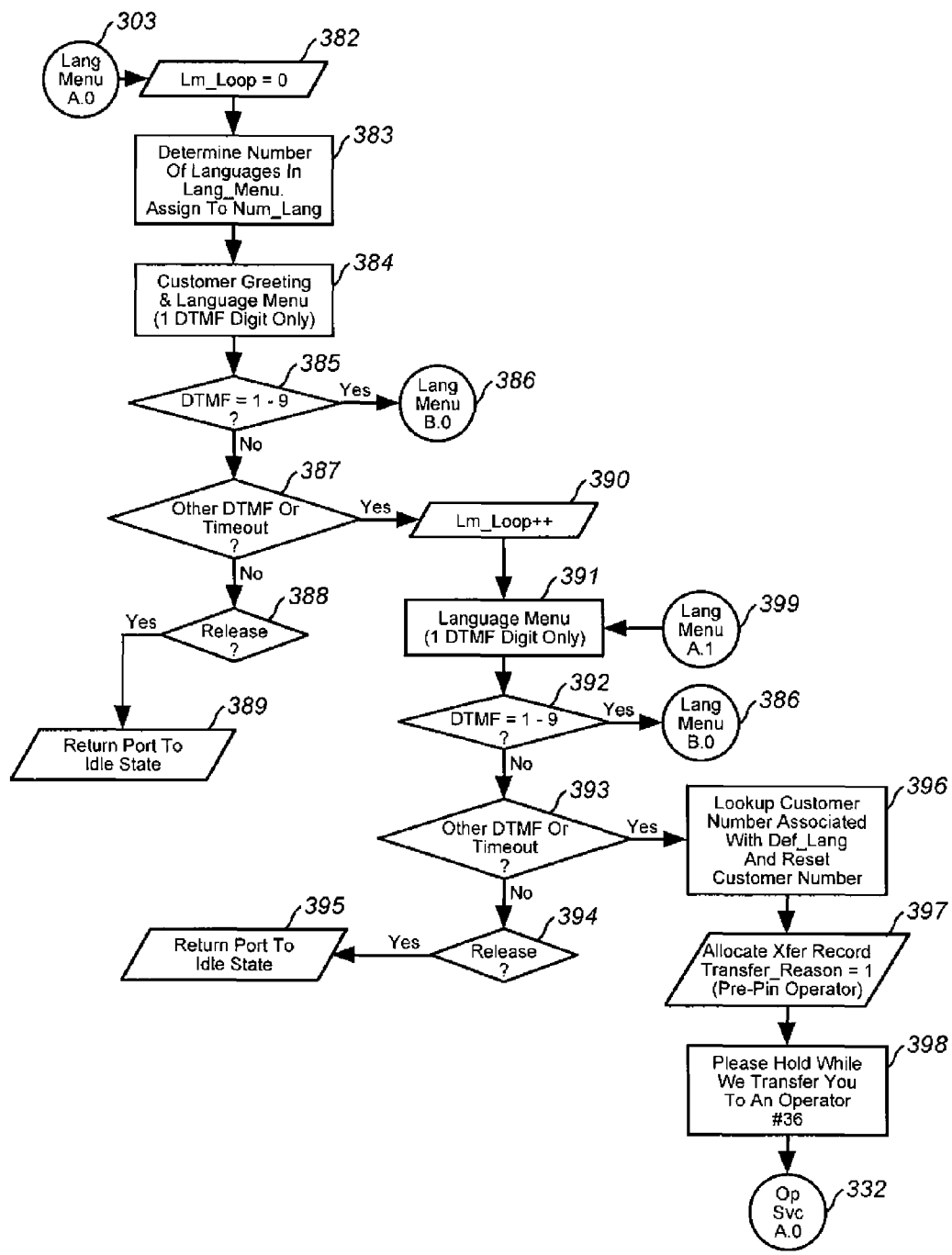
FIG. 3D is a continuation call flow diagram of the call flow diagram started in FIGS. 3A-3C.
Figure 3E:
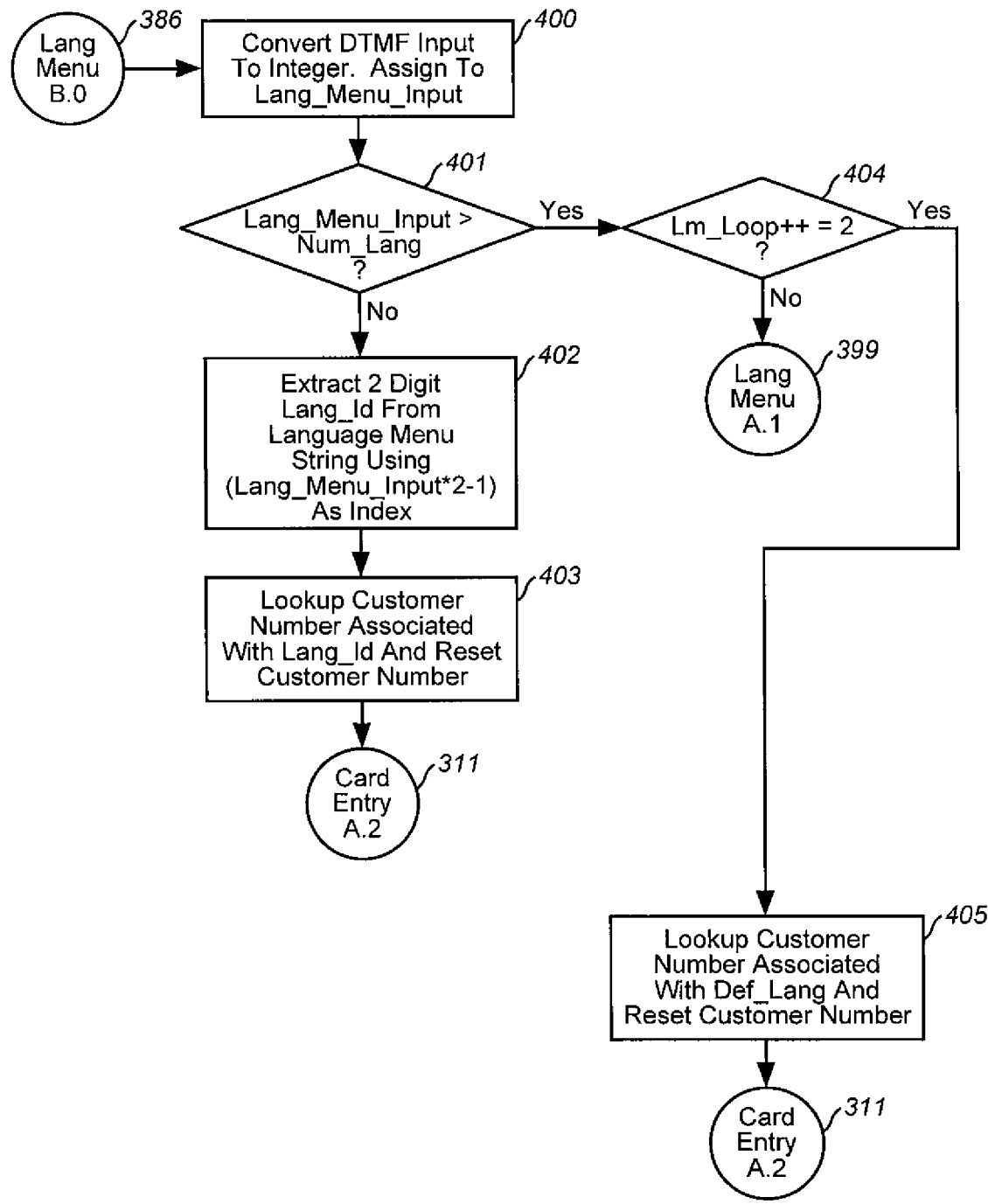
FIG. 3E is a continuation call flow diagram of the call flow diagram started in FIGS. 3A-3D.
Figure 3F:
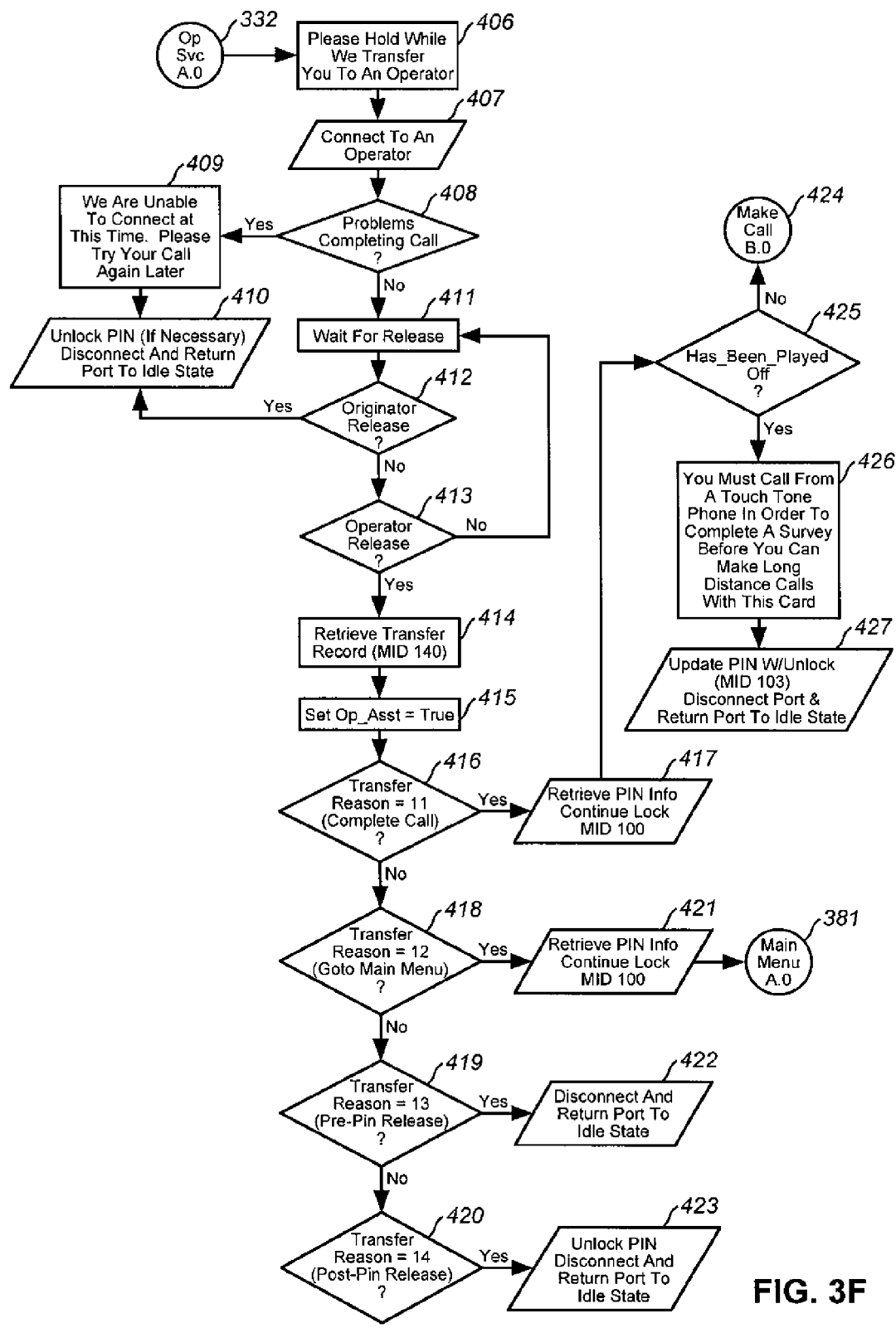
FIG. 3F is a continuation call flow diagram of the call flow diagram started in FIGS. 3A-3E.
Figure 3G:
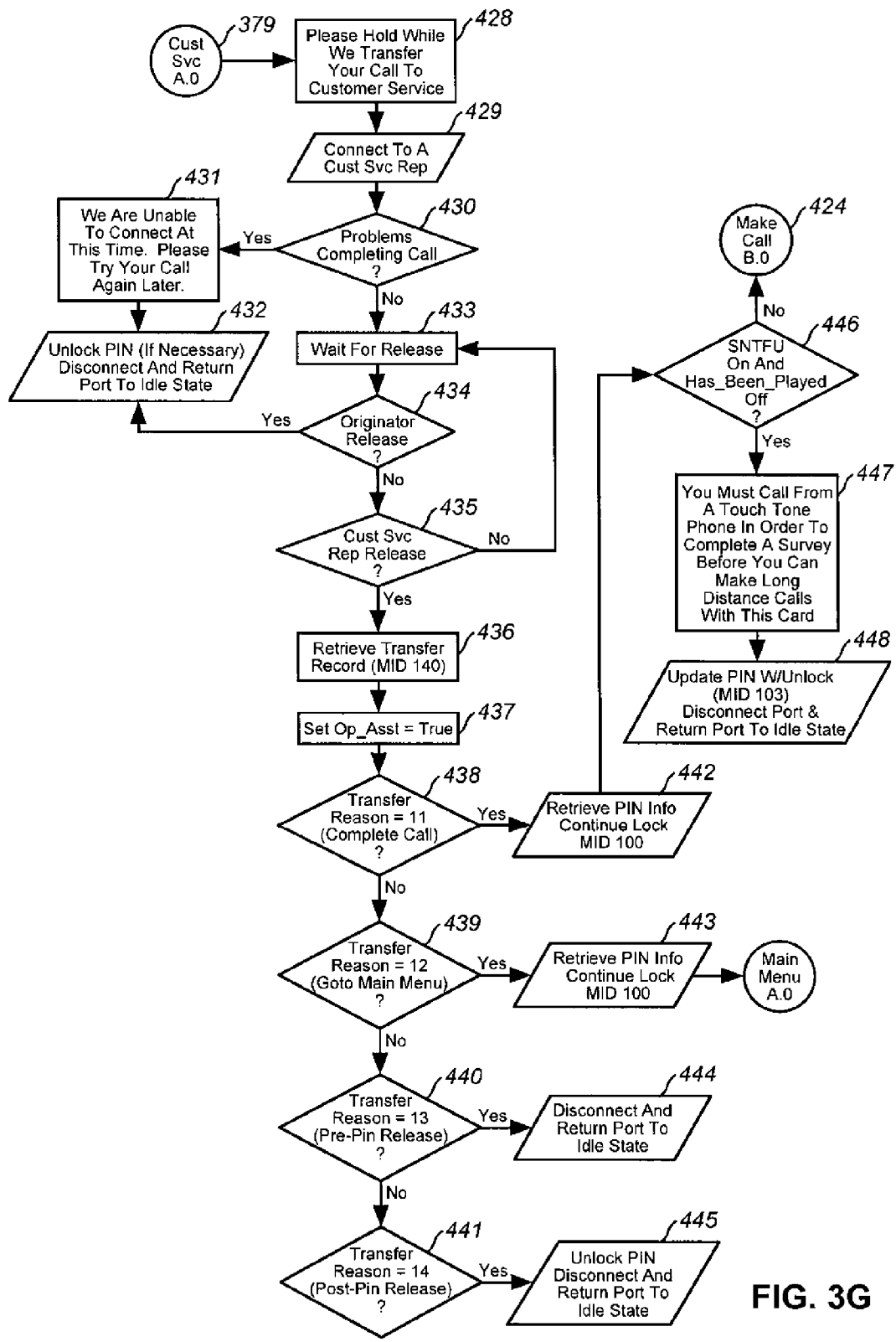
FIG. 3G is a continuation call flow diagram of the call flow diagram started in FIGS. 3A-3F.
Figure 3H:
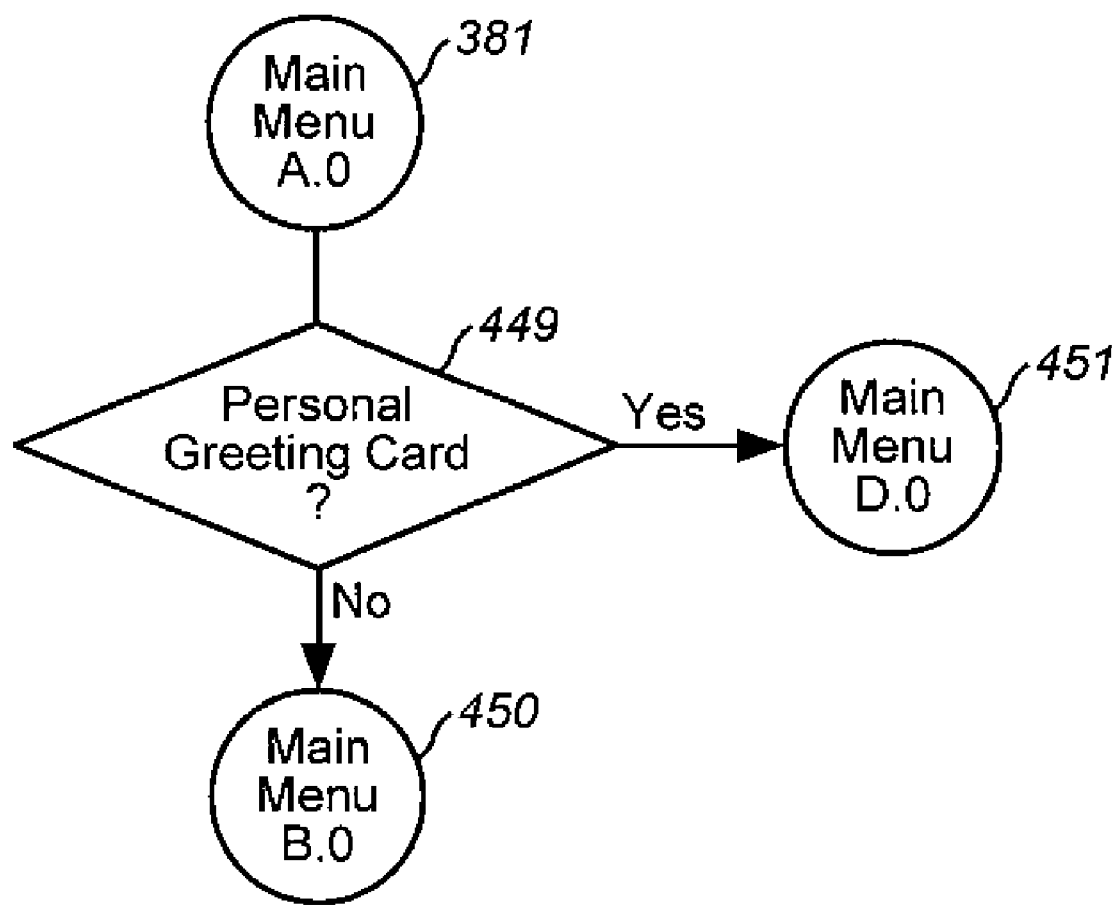
FIG. 3H is a continuation call flow diagram of the call flow diagram started in FIGS. 3A-3G.
Figure 3I:
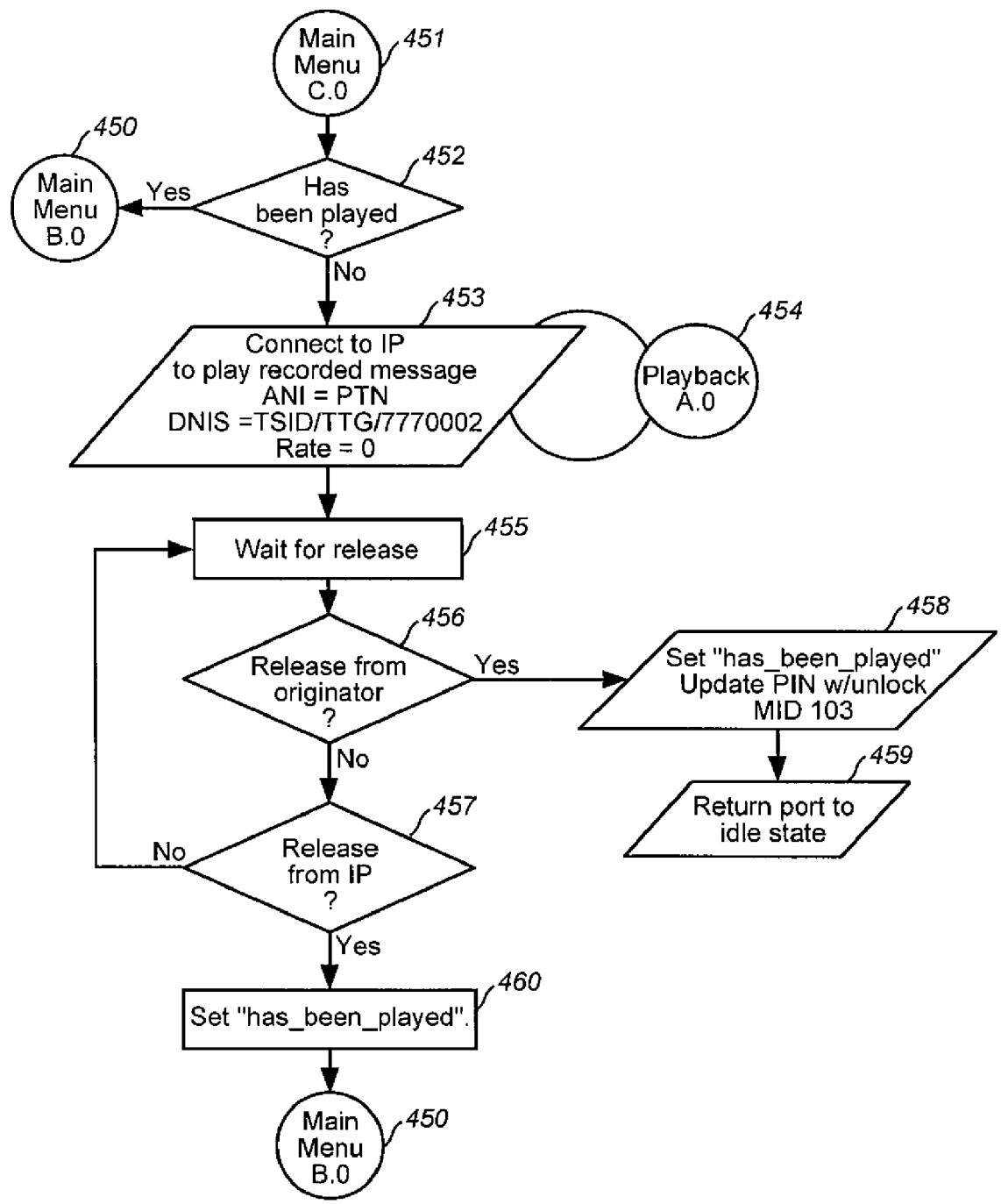
FIG. 3I is a continuation call flow diagram of the call flow diagram started in FIGS. 3A-3H.
Figure 3J:
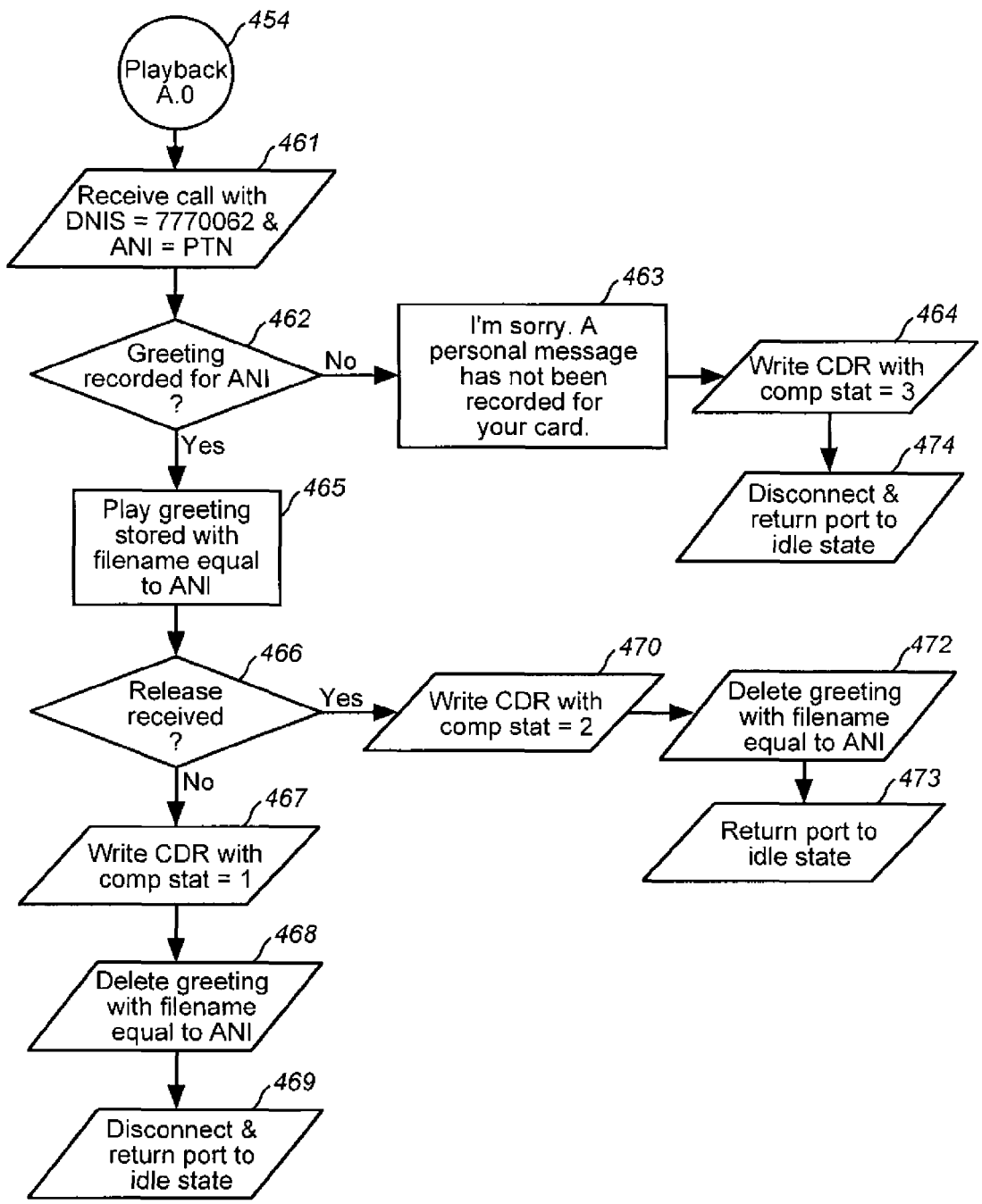
FIG. 3J is a continuation call flow diagram of the call flow diagram started in FIGS. 3A-3I.
Figure 3K:
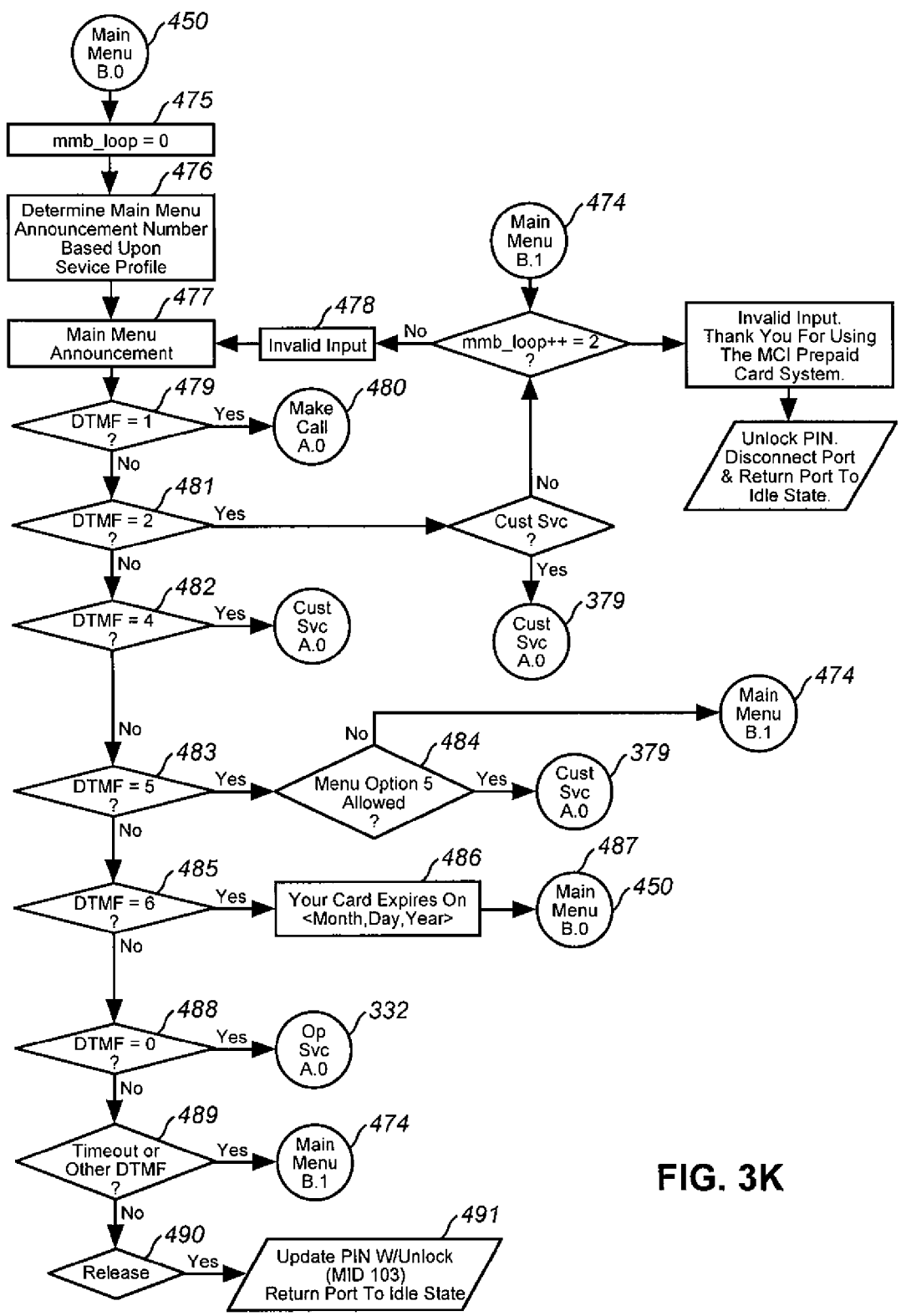
FIG. 3K is a continuation call flow diagram of the call flow diagram started in FIGS. 3A-3J.
Figure 3L:
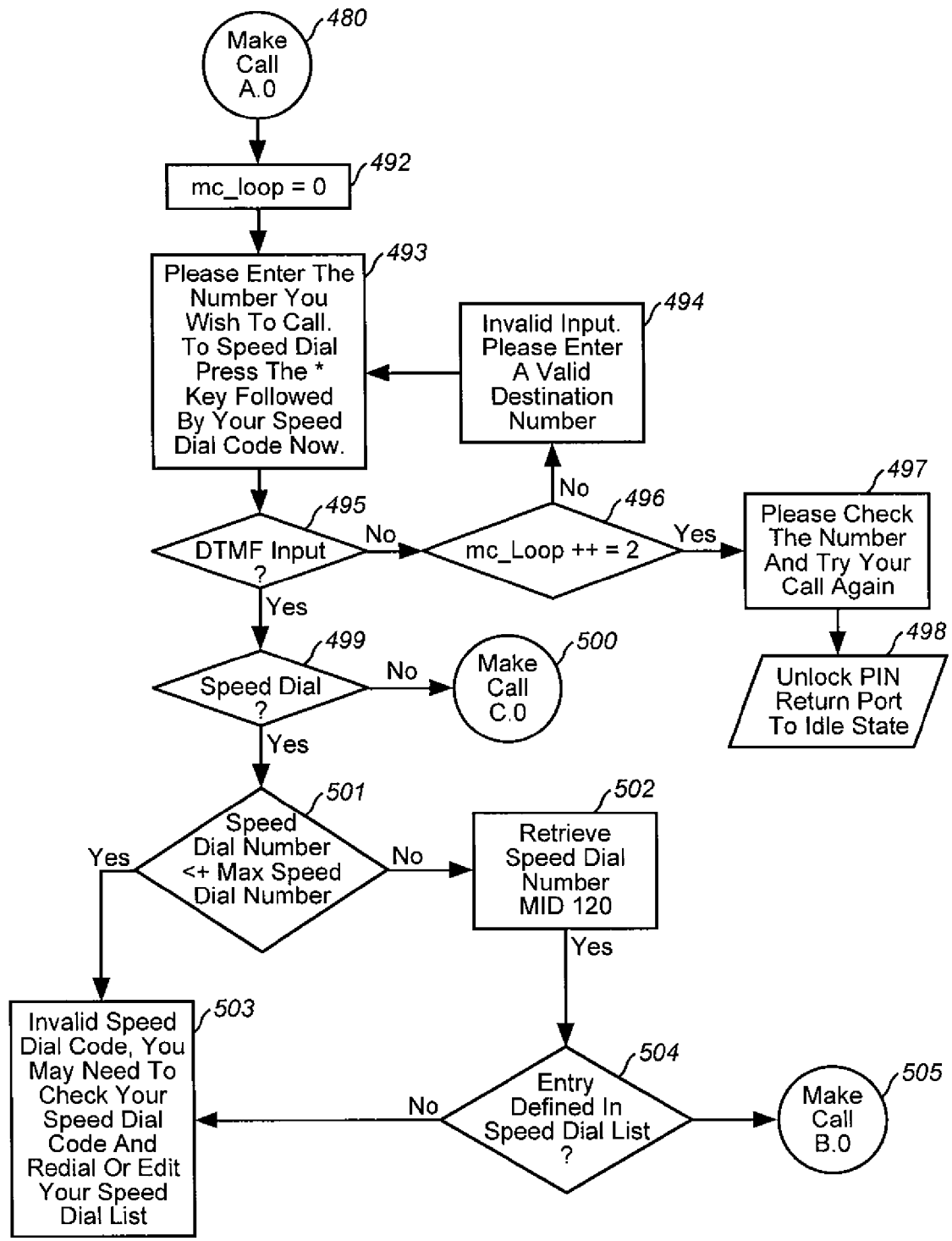
FIG. 3L is a continuation call flow diagram of the call flow diagram started in FIGS. 3A-3K.
Figure 3M:
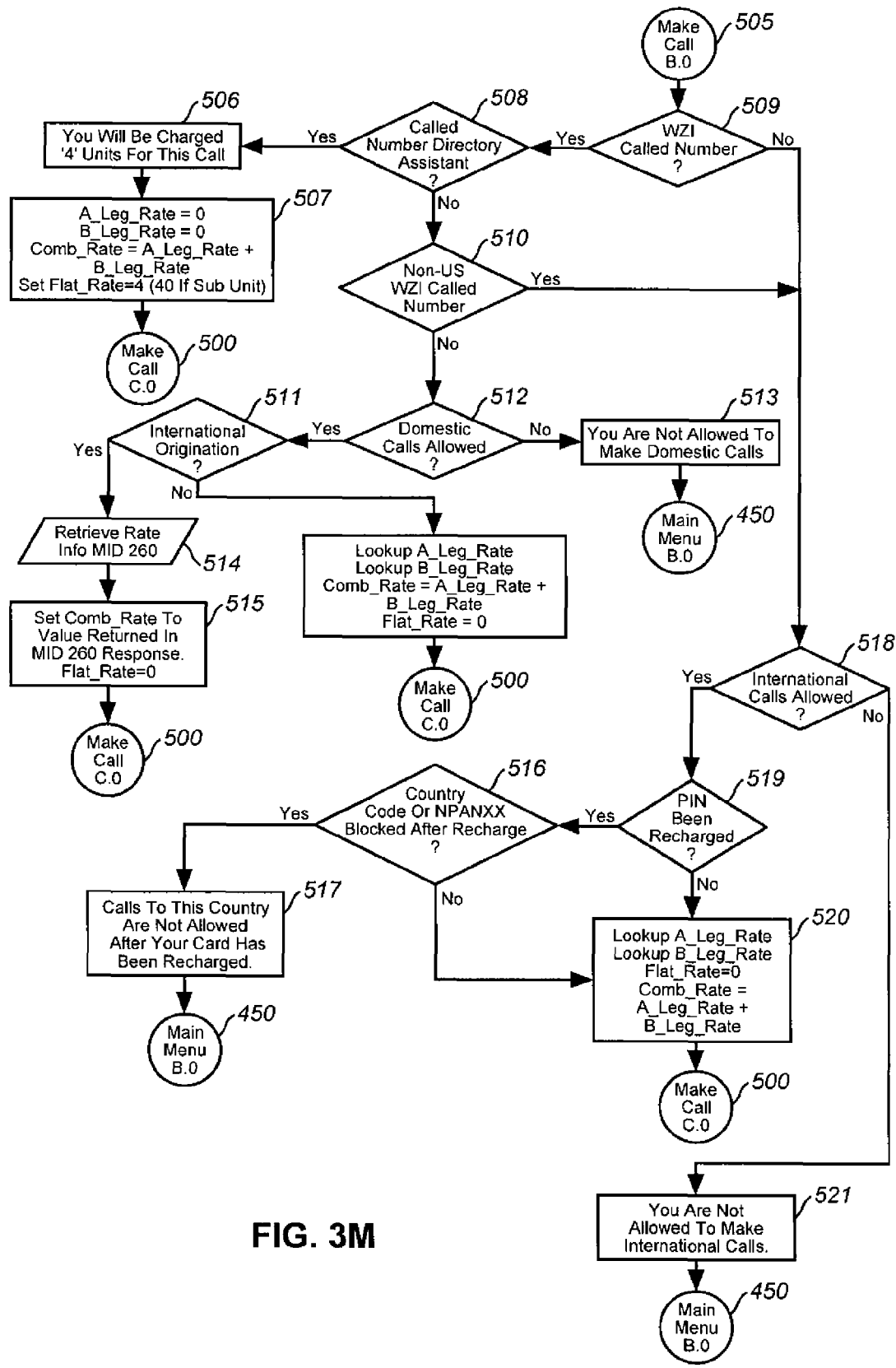
FIG. 3M is a continuation call flow diagram of the call flow diagram started in FIGS. 3A-3L.
Figure 3N:
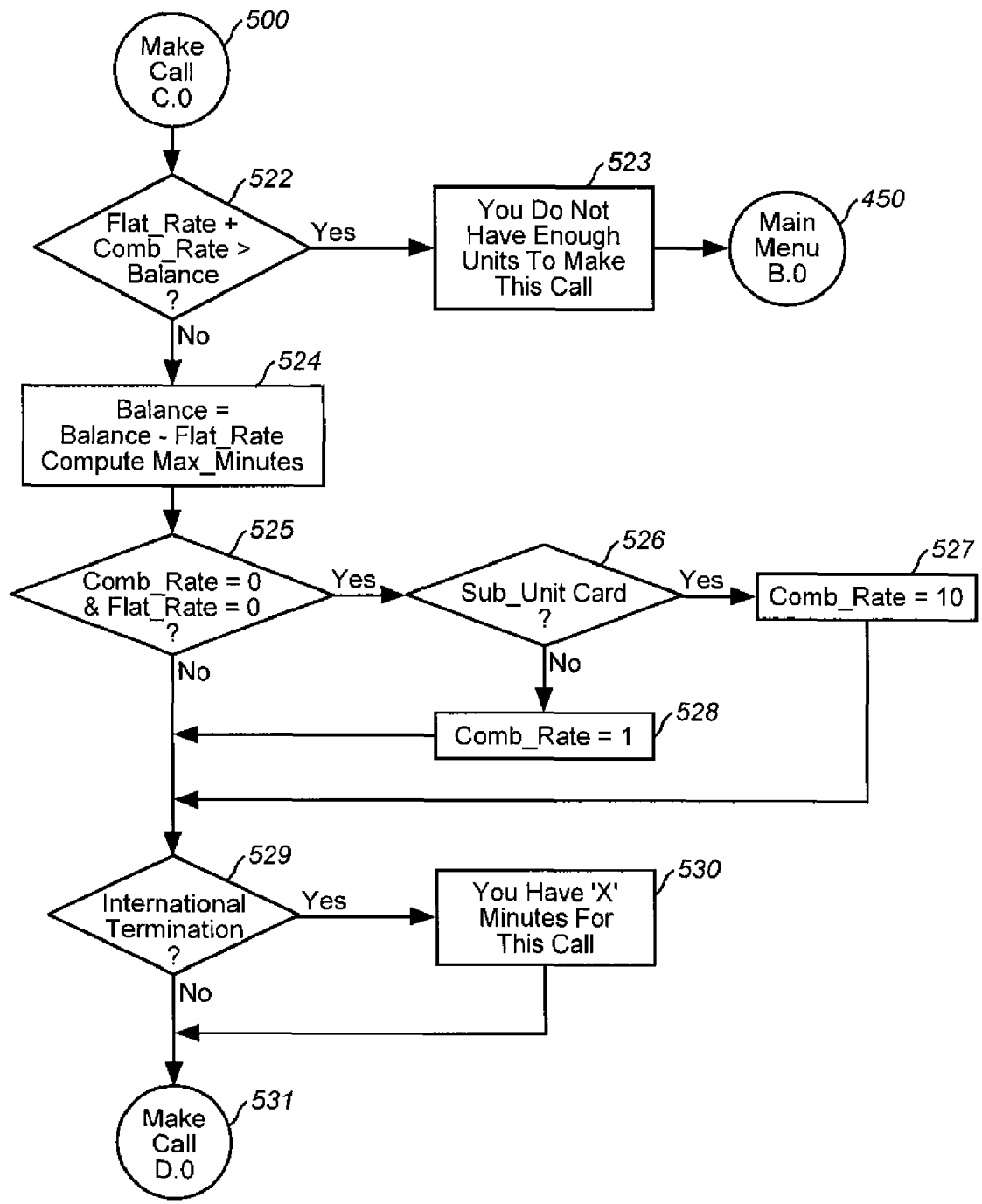
FIG. 3N is a continuation call flow diagram of the call flow diagram started in FIGS. 3A-3M.
Figure 3O:
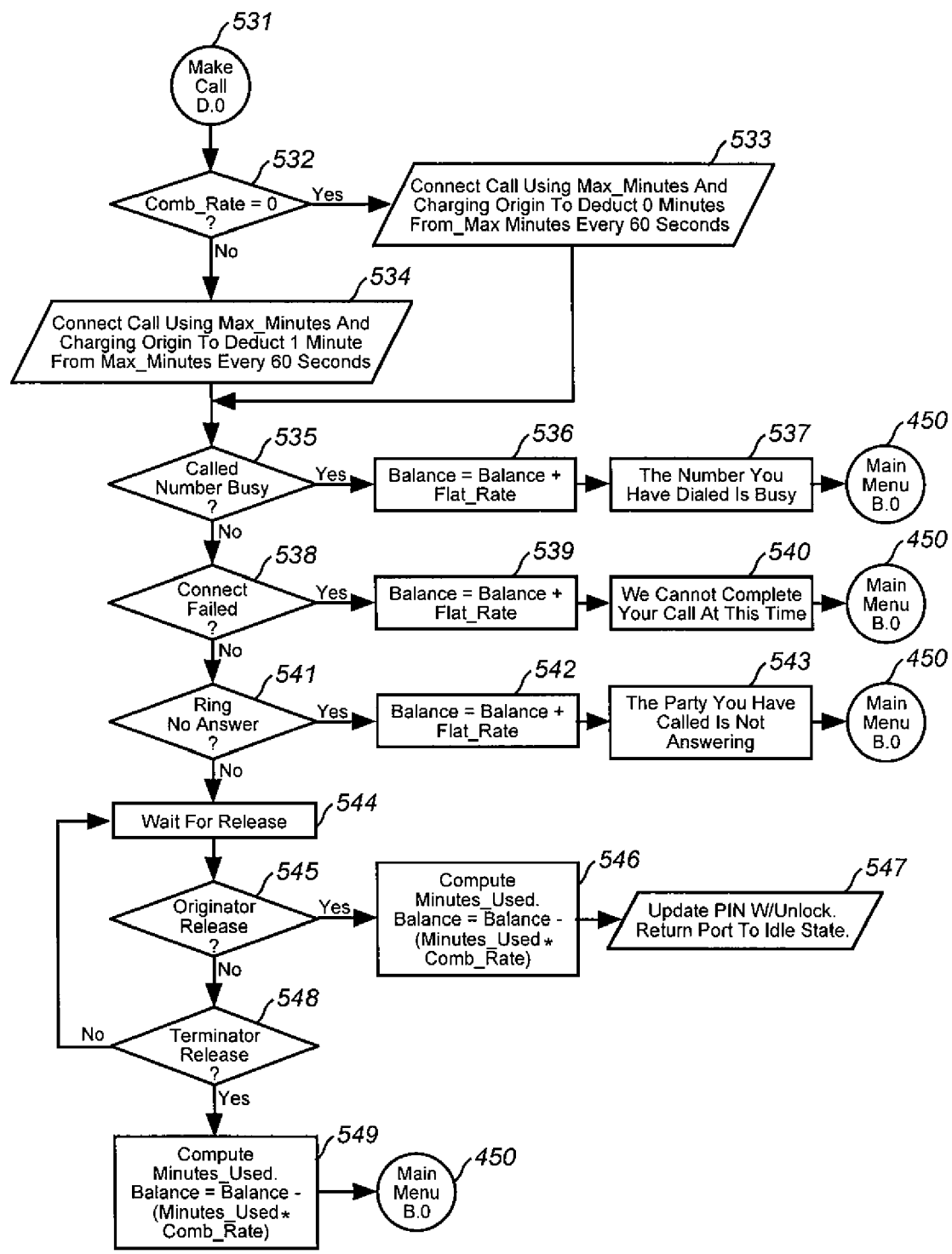
FIG. 3O is the conclusion of the call flow diagram started in FIGS. 3A-3N.

The operations carried out within system 100 to facilitate such pre-paid card use by a card user are illustrated in the call flow diagrams shown in FIGS. 3A-3O to which reference is now made.

Referring now to FIG. 3A, depicted therein is a call flow diagram related to the use of a pre-paid card in accordance with the present invention. FIG. 3A includes steps 301-332. The process steps depicted in steps 3A are self-explanatory and, accordingly, are discussed herein in summary. A calling party (e.g., a card user) dials a pre-paid card access number (e.g., a 1-800 access number) to access the pre-paid calling card processing system 104 via the PSTN 102, for example. Based on the access number whence the calling party accesses pre-paid calling card system 104 at step 302, an appropriate language menu at step 303 may need to be provided to the calling party (e.g., for callers in foreign countries for example). Otherwise, if the calling party is dialing an access number that corresponds to a domestic access number, processing proceeds as otherwise indicated in FIG. 3A and the calling party will be prompted with the various prompts illustrated therein and, in particular, to enter a card/PIN number/identifier associated with his pre-paid card, etc.

If, at step 304, an alternative language is to be used to prompt a calling party in relation to his pre-paid card, processing will proceed to step 303 at the top of FIG. 3D and, in particular, to the steps within FIGS. 3D and 3E. FIGS. 3D and 3E include process steps 382-405 and are intended to illustrate exemplary operations to allow a calling party to select a particular language by which pre-paid telephone calling card processing system 104 will manifest audible voice prompts to a calling party (e.g., French prompts to a French-speaking card user, etc). Those skilled in the art will immediately understand the process steps illustrated in FIGS. 3D and 3E. It should be noted, however, that their are references to operator services within FIG. 3D that are illustrated within FIG. 3F as discussed below.

After the calling party is prompted to enter his prepaid card number (e.g., a 10 digit DTMF PIN code/card identifier associated with his pre-paid calling card), processing will proceed at the top of FIG. 3B to verify the card number (PIN code associated with the pre-paid card) and to allow further processing as indicated in FIG. 3B.

If the ten digit DTMF string of digits entered by the calling party is an invalid string (e.g., one containing only symbols such as multiple "*" and "#" entered via a telephone key pad) and a release did not occur on the telephone call into the pre-paid calling card processing system 104, operator service may be automatically initiated at step 331 and processing will then proceed at step 332 at the top of FIG. 3F. In FIG. 3F, process steps 406-427 are illustrated to exemplify operator assistance to a caller who has not entered an appropriate DTMF sequence that can correspond to a card number or PIN code associated with a pre-paid card as stored in SDP 106 (FIG. 1).

Depicted in FIG. 3B are process and call flow steps 314, 318, and 338-361. Such process and call flow steps are self-explanatory and accordingly, are discussed herein in summary. In FIG. 3B, the ten-digit PIN code entered by the calling party (also referred to above as the card number/identifier) are verified in relation to PIN data stored in SDP 106 as shown in FIG. 1. If the PIN code is an active PIN code indicating that the pre-paid calling card is valid and usable (although minutes/units may be depleted) then processing proceeds to step 341 at the top of FIG. 3C.

In FIG. 3C, process steps 362-381 are carried out to further validate the calling party's pre-paid card (e.g., pre-paid card 120). Additionally, the amount of remaining minutes left on the calling party's pre-paid card 120 will be analyzed at step 363 and the calling party will be correspondingly notified as to the balance at steps 364 and 380, respectively. If pre-paid card 120 contains remaining cal units (e.g., minutes of long distance telephone service, etc.), processing will proceed at the top of FIG. 3H and, in particular, at step 381 therein.

It is important to note that the present invention will accommodate recharging and, in particular, recharge activation operations to cause an additional number of calling units to be associated with a particular pre-paid card, etc. Accordingly, if at step 364 the calling party is prompted that his pre-paid card has a zero unit balance, processing may proceed through to step 368, and to step 378 to reach customer service at step 379 as indicated at the top of FIG. 3G. In FIG. 3G, process steps 428-448 illustrate the sequence of operations that may be carried out to have a live operator manually recharge the calling party's pre-paid card. Such recharge operations are, in actuality, database operations to adjust remaining unit counts in SDP 106 (FIG. 1) which correspond to pre-paid 120. A discussion of such recharge operations may be found in co-pending U.S. patent application Ser. No. 09/089,815 entitled "POINT OF SALE ACTIVATION AND DEACTIVATION OF PRE-PAID TELEPHONE CALLING CARDS," which is commonly assigned and incorporated herein by reference.

Referring now to FIG. 3H, depicted therein is a decisional call flow diagram related to determining weather pre-paid card 120 is a personal greeting type card that is provided in accordance with the present invention. If pre-paid card 120 is a personal greeting type card, processing proceeds to step 451 at the top of FIG. 3I. If not, processing proceeds to step 450 at the top of FIG. 3K.

Referring now to FIG. 3I, depicted therein is a call flow sequence for determining whether a pre-recorded personal greeting associated with pre-paid card 120 has been played by pre-paid telephone calling card processing system 104 during an earlier pre-paid card usage session initiated by a card user. If the pre-recorded message has not been played, as determined at step 452, processing will proceed to step 453, where pre-paid telephone calling card processing system 104 will connect to a voice response system such as voice response system 107 to play the pre-recorded message which was prerecorded by the card purchaser. In launching such a process, the ANI on that launched call/session will be set up to be equal to a PIN Tracking Number/PIN or card identifier associated with the pre-paid calling card as stored in SDP 106 in relation to one or more data records for pre-paid card 120. Accordingly, automatic play-back of the pre-recorded message will occur at step 454 as indicated at the top of FIG. 3J, via voice response system 107 or other voice response platform. FIG. 3J includes process steps 461-469 which illustrate the automatic playback or manifesting of a pre-recorded message/personal greeting during a telephone call (e.g., during an access call) initiated by the calling party in relation to pre-paid card 120. At step 465, the pre-recorded personal greeting associated with a file name which was set to be equal to the ANI code will be played via the telephone call session to pre-paid calling card processing system 104 from the calling party (card user). Thereafter, at step 467-469, voice response system 107 will write a call detail record with a completion status indicating "1" (for played, for example), will delete the greeting with the file name equal to the ANI code received from voice response-system 107, and will disconnect and return its port to an idle state. Processing will then return back to the steps illustrated in FIG. 3I.

If at 456 in FIG. 3I, the calling party (e.g., card user) releases from his access telephone call, an appropriate flag will be set within pre-paid telephone calling card processing system 104 to a "has been played" status and an appropriate return port will be set to an idle state. If the calling party does not release from the call at step 456, pre-paid calling card processing system 104 (e.g., SSCP 108, etc) will release from the voice response system 107 and processing will proceed to step 450 as indicated at the top of FIG. 3K.

Referring now to FIG. 3K, depicted therein is a call flow diagram that includes process steps 475-491. The purpose of such process steps are to prompt the card user with a main menu including announcements allowing corresponding DTMF entries to occur to either access a customer service, or place a call (e.g., a long distance telephone call, etc.) in accordance with remaining call units (e.g., minutes, etc.) related to pre-paid card 120 as stored in SDP 106, for example. At step 477, a main menu is voiced to the calling party (card user). If the calling party elects to make a call as indicated by pressing the "1" key on his DTMF telephone keypad, processing proceeds to step 480 as illustrated at the top of FIG. 3L. The remaining steps within FIG. 3K are self-explanatory and have been addressed with regard to FIGS. 3A-3J.

Referring now to FIG. 3L, depicted therein is the start of a call flow which will allow a calling party (card user) to initiate a outbound call in relation to his pre-paid card 120. That call flow is further illustrated in FIGS. 3M-3O which include process steps 500-549, which steps will be immediately apparent and understood by those skilled and knowledgeable in the art of pre-paid cards, after careful review of the process steps depicted therein.

Thus, having fully described the present invention by way of example with reference to attached drawing figures, it will be readily appreciated that many changes and modifications may be made to the invention and to any of the exemplary embodiments shown and/or described herein without departing from the spirit or scope of the invention, which is defined in the appended claims.

What is claimed is:

1. A method executed by one or more processors, comprising:

detecting an access call corresponding to a pre-paid card that has an associated pre-recorded message;

retrieving the message for playback without prompting during the access call; and maintaining status of whether the message has been played.

2. A method according to claim 1, further comprising:

detecting establishment of a setup call for the pre-paid card; and receiving a request to record the message during the setup call.

3. A method according to claim 2, wherein the request to record the message is initiated by a user of the pre-paid card using a telephone station in communication with an interactive voice response system.

4. A method according to claim 1, wherein the access call is placed using a toll-free number.

5. A method according to claim 1, further comprising:

storing data corresponding to the pre-paid card, wherein the data specifies a number of available service units.

6. A method according to claim 5, wherein the service units relate to telephone call service minutes.

7. A method according to claim 6, wherein the service units are rechargeable.

8. An apparatus comprising:

at least one processor; and at least one memory including computer program code, the at least one memory and the computer program code configured to, with the at least one processor, cause the apparatus to perform at least the following, detect an access call corresponding to a pre-paid card that has an associated pre-recorded message, retrieve the message for playback without prompting during the access call, and maintain status of whether the message has been played.

9. An apparatus according to claim 8, wherein the apparatus is further caused, at least in part, to:

detect establishment of a setup call for the pre-paid card; and receive a request to record the message during the setup call.

10. An apparatus according to claim 9, wherein the request to record the message is initiated by a user of the pre-paid card using a telephone station in communication with an interactive voice response system.

11. An apparatus according to claim 8, wherein the access call is placed using a toll-free number.

12. An apparatus according to claim 8, wherein the apparatus is further caused, at least in part, to:

store data corresponding to the pre-paid card, wherein the data specifies a number of available service units.

13. An apparatus according to claim 12, wherein the service units relate to telephone call service minutes.

14. An apparatus according to claim 13, wherein the service units are rechargeable.

15. A computer-readable storage medium carrying one or more sequences of one or more instructions which, when executed by one or more processors, cause an apparatus to at least perform the following steps:

detecting an access call corresponding to a pre-paid card that has an associated pre-recorded message;

retrieving the message for playback without prompting during the access call; and maintaining status of whether the message has been played.

16. A computer-readable storage medium of claim 15, wherein the apparatus is caused, at least in part, to further perform:

detecting establishment of a setup call for the pre-paid card; and receiving a request to record the message during the setup call.

17. A computer-readable storage medium of claim 16, wherein the request to record the message is initiated by a user of the pre-paid card using a telephone station in communication with an interactive voice response system.

18. A computer-readable storage medium of claim 15, wherein the access call is placed using a toll-free number.

19. A computer-readable storage medium of claim 15, wherein the apparatus is caused, at least in part, to further perform:

storing data corresponding to the pre-paid card, wherein the data specifies a number of available service units.

20. A computer-readable storage medium of claim 19, wherein the service units relate to telephone call service minutes.

\* \* \* \* \*